United States Patent
Khoo et al.

(10) Patent No.: US 12,100,143 B2
(45) Date of Patent: Sep. 24, 2024

(54) LABEL-FREE LIQUID BIOPSY-BASED DISEASE MODEL, ANALYTICAL PLATFORM AND METHOD FOR PREDICTING DISEASE PROGNOSIS

(71) Applicant: City University of Hong Kong, Hong Kong (CN)

(72) Inventors: Bee Luan Khoo, Hong Kong (CN); Haojun Hua, Hong Kong (CN); Wei Li, Hong Kong (CN)

(73) Assignee: City University of Hong Kong, Hong Kong (CN)

( * ) Notice: Subject to any disclaimer, the term of this patent is extended or adjusted under 35 U.S.C. 154(b) by 370 days.

(21) Appl. No.: 17/663,287

(22) Filed: May 13, 2022

(65) Prior Publication Data
US 2023/0368374 A1    Nov. 16, 2023

(51) Int. Cl.
*G06T 7/00* (2017.01)
*G06T 7/11* (2017.01)
*G06V 20/69* (2022.01)

(52) U.S. Cl.
CPC .............. *G06T 7/0012* (2013.01); *G06T 7/11* (2017.01); *G06V 20/695* (2022.01); *G06V 20/698* (2022.01); *G06T 2207/10056* (2013.01); *G06T 2207/20081* (2013.01); *G06T 2207/20084* (2013.01); *G06T 2207/30024* (2013.01); *G06T 2207/30096* (2013.01)

(58) Field of Classification Search
CPC ..................... G06T 7/0012; G06T 7/11; G06T 2207/10056; G06T 2207/20081; G06T 2207/20084; G06T 2207/30024; G06T 2207/30096; G06T 7/13; G06T 2207/20132; G06V 20/695; G06V 20/698; G06V 10/764; G06V 10/82; C12M 23/16; C12M 41/46; G06N 3/08; G16H 50/30
USPC ......................................................... 382/133
See application file for complete search history.

(56) References Cited

U.S. PATENT DOCUMENTS

| | | | |
|---|---|---|---|
| 7,407,799 B2 * | 8/2008 | Balagadde ................ | C12P 1/00 435/289.1 |
| 9,789,485 B2 * | 10/2017 | Han .................... | B01L 3/50273 |
| 10,441,225 B2 * | 10/2019 | Madabhushi ......... | G06T 7/0014 |
| 10,768,079 B2 * | 9/2020 | Angros ............ | G01N 35/00029 |
| 10,774,372 B2 * | 9/2020 | Chee .................... | C12Q 1/6853 |

(Continued)

FOREIGN PATENT DOCUMENTS

| | | | | |
|---|---|---|---|---|
| JP | 2020073885 A | * | 5/2020 | ................ B01L 3/00 |
| WO | WO-2012094642 A2 | * | 7/2012 | ........ B01L 3/502761 |

(Continued)

*Primary Examiner* — Mahendra R Patel
(74) *Attorney, Agent, or Firm* — S&F/WEHRW

(57) ABSTRACT

The present disclosure provides a platform and method for predicting disease prognosis based on label-free liquid biopsy, in particular, to establish a disease model in vitro on a microfluidic device and provide a trained deep learning neural network for automatically extracting morphological features from cell clusters formed by the label-free liquid biopsy of a test subject in order to predict different disease stages and evaluate efficacies of a corresponding treatment regime to the test subject. The present disclosure also provides a method for training the neural network based on different cell cluster datasets obtained from the disease model corresponding to different deep learning models of the neural network.

18 Claims, 21 Drawing Sheets

(56) References Cited

U.S. PATENT DOCUMENTS

| | | | |
|---|---|---|---|
| 11,753,613 B2* | 9/2023 | Agrawal | C12M 23/36 |
| | | | 435/374 |
| 11,788,120 B2* | 10/2023 | Sims | C12N 15/1006 |
| | | | 435/6.12 |
| 11,788,127 B2* | 10/2023 | Gubatayao | G01N 35/00693 |
| | | | 435/6.12 |
| 11,986,299 B2* | 5/2024 | Andeshmand | A61B 5/150961 |
| 2002/0009015 A1* | 1/2002 | Laugharn, Jr. | B01J 19/10 |
| | | | 366/108 |
| 2007/0116607 A1* | 5/2007 | Wang | B01L 3/502715 |
| | | | 422/83 |
| 2020/0347449 A1* | 11/2020 | Rozenblatt-Rosen | |
| | | | C40B 50/18 |
| 2021/0055283 A1* | 2/2021 | Collins | C12M 41/48 |
| 2021/0366577 A1* | 11/2021 | Koller | G16H 50/20 |
| 2022/0284574 A1* | 9/2022 | Wagner | C12M 29/02 |

FOREIGN PATENT DOCUMENTS

| | | | | |
|---|---|---|---|---|
| WO | WO-2013126774 A2 * | 8/2013 | | B01L 3/502753 |
| WO | WO-2015061907 A1 * | 5/2015 | | C12M 1/34 |
| WO | WO-2020028313 A1 * | 2/2020 | | G01N 15/147 |
| WO | WO-2021041709 A1 * | 3/2021 | | B01L 3/502715 |
| WO | WO-2022178095 A1 * | 8/2022 | | G06N 20/00 |

\* cited by examiner

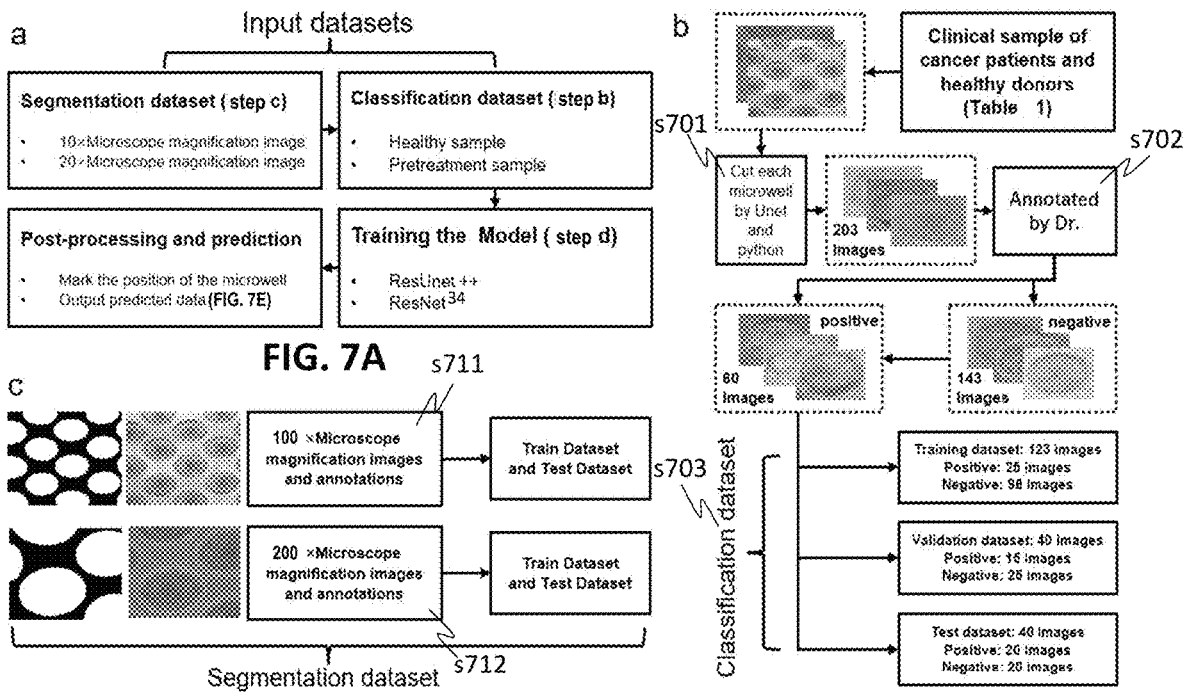
FIG. 7A
FIG. 7C
FIG. 7B
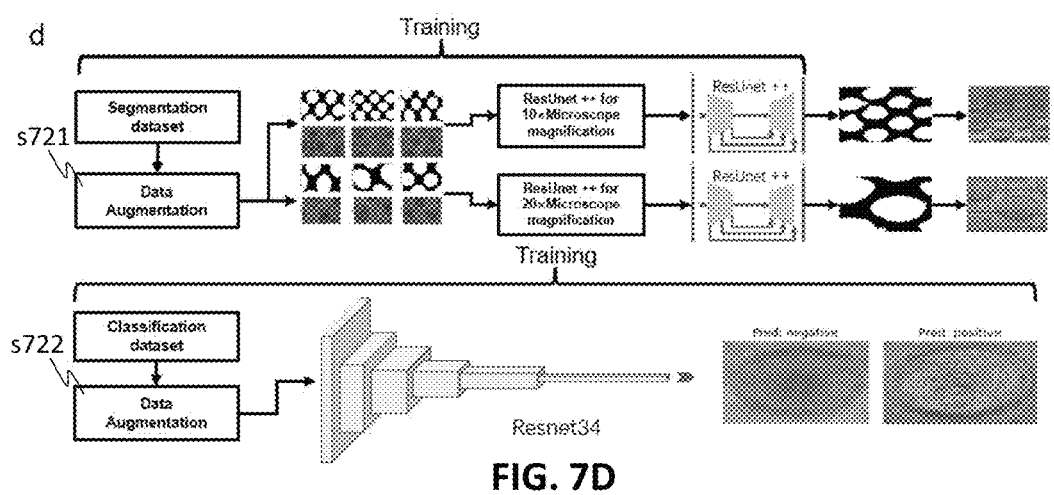
FIG. 7D
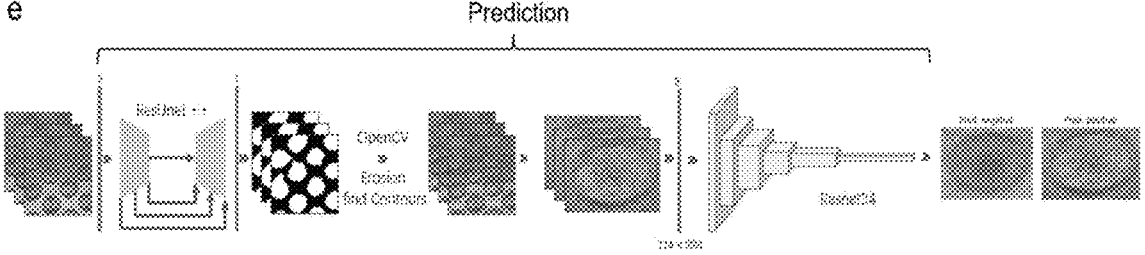
FIG. 7E

LABEL-FREE LIQUID BIOPSY-BASED DISEASE MODEL, ANALYTICAL PLATFORM AND METHOD FOR PREDICTING DISEASE PROGNOSIS

TECHNICAL FIELD

The present invention relates to a platform and method for predicting disease prognosis based on label-free liquid biopsy, in particular, to establish a disease model in vitro on a microfluidic device and provide a trained deep learning neural network for automatically extracting morphological features from cell clusters formed by the label-free liquid biopsy of a test subject in order to predict different disease stages and evaluate efficacies of a corresponding treatment regime to the test subject.

BACKGROUND

Cancer is one of the leading causes of mortality globally. The conventional diagnostic method for cancer is solid tumor biopsy, which is invasive and can cause discomfort. Besides, the procedure is very cumbersome and time consuming. Liquid biopsy provides a relatively less invasive method for detecting disease-related biomarkers, leading to new technologies. The advantages of liquid biopsies, such as ease of sample collection and minimal invasiveness, make it an ideal method for routine evaluation. Common biomarkers in liquid biopsy can be protein, gene, or cell based. Detecting proteins or genes involves targeted probe labeling, which requires a prior knowledge of a comprehensive biomarker profile. However, due to the heterogeneity of tumors, common protein and gene cancer-associated biomarkers cannot fully recapitulate the characteristics of tumors. In addition, cancer cells may undergo phenotypic changes or mutations during treatment, making detecting protein-based or gene-based biomarkers challenging.

Conventional cancer-related research usually utilizes commercially available cancer cell lines; however, these are not clinically relevant, and are limited for applications such as anti-cancer drug screening, preclinical testing, and biomarkers discovery. Due to the multivariate factors affecting tumor progression, it has been challenging to establish a clinically relevant cancer model in vitro. Multivariate factors include tumor growth, proliferation, migration, invasion, matrix remodeling, dormancy, infiltration, extravasation, angiogenesis, and drug delivery. In addition, tumors are highly heterogeneous structures, including cancer and non-cancerous cells, rarely reflected in vitro models.

Circulating tumor cells (CTCs) in the blood of patients are shed from multiple regions and thus better reflect the heterogeneous profile of tumors, making them a promising biomarker for cancer diagnosis and treatment. However, CTCs are relatively rare in liquid biopsy, usually in the range of 0-1000s CTCs in 1 mL of blood. In addition, once CTCs are shed from the primary or metastatic tumor, the cells will initiate apoptosis. Cell-free DNA from CTCs cannot fully recapitulate functional properties, such as tumor origin. Therefore, the detection of viable CTCs presents unprecedented advantages. The recovery of CTCs retains critical information localized to single cells and can reflect the presence of rare cells that will ultimately play a pivotal role in tumor progression.

In order to establish an effective early prediction tool for personalized medicine, at least the following factors should be considered: (i) strong correlation with the disease, (ii) timely readouts, and (iii) ease of use. These factors are critical for clinicians to understand the patient's condition and design appropriate treatment measures. Current cancer-associated algorithms focus on analyzing non-clinical spheroid characterization. With the advancement of microfluidic technology, the reflection of patient prognosis based on CTCs has become tangible. However, most of the current CTC expansion techniques have long cultivation periods (>6 months), require growth factors, and are low in efficacy (<20%), leading to high costs and challenges in data interpretation.

In recent years, microfluidic technology has been widely used in the field of particle detection and biomedicine, such as point of care testing, organs-on-a-chip, drug discovery, microbiology, and liquid biopsy. Cell sorting techniques can be divided into label-based and label-free technology. Label-based methods generally rely on affinity binding technology or the use of different optical, acoustic, electrical, or magneto-caloric properties between cancer cells and blood cells to identify biomarkers. Label-free methods mainly capitalize on the unique physical properties of cancer cells, such as size, density, stiffness, viscosity, and deformability. Although label-free methods tend to achieve high-throughput separation and detection, drawbacks such as biofouling, low recovery rates, and loss of cell viability are still prevalent.

On the other hand, patient-derived tumor models can effectively promote translational efforts. Patient-derived tumor models can be classified into five subtypes, i.e., 3D culture systems, conditionally reprogrammed cell cultures, organotypic tissue slices, patient-derived xenograft models, and microchamber cultures. Three-dimensional cultures are generally preferred, as they can better recapitulate the in vivo environment, and hence demonstrate higher sensitivity to drug treatment, as well as reflect biomarker profiles more similar to in vivo environments than 2D cultures.

To design an effective early prediction tool for personalized medicine, the following factors should be taken into account: (i) strong correlation with the disease, (ii) timely readouts, and (iii) ease of use. These factors are critical for clinicians to understand the patient's condition and design appropriate treatment measures.

Current cancer-associated algorithms focus on analyzing non-clinical spheroid characterization, which are mainly established from cell lines. In addition, the conventional neural network classification method cannot detect multiple regions in an image. Other traditional target detection algorithms such as Yolo and Faster RCNN require a large number of sample annotations, which is very time-consuming for doctors and experts.

A need therefore exists for an improved, fully automated, and unique prediction platform and method for clinical prognosis of a patient that eliminates or at least diminishes the disadvantages and problems described above.

SUMMARY OF THE INVENTION

Therefore, one of the main objectives of the present invention is to provide a label-free, patient-derived liquid biopsy-based disease model for early prediction of disease prognosis and also for evaluation of a treatment regime during the treatment stages.

Another main objective of the present invention is to develop a fully automated analytical tool based on the image data obtained from different clusters of cells characterized in the liquid biopsy of a patient in order to provide an accurate prediction of a clinical event as short as in one treatment cycle, and customize or optimize a suitable treatment regime for the patient accordingly.

Accordingly, one aspect of the present invention provides an integrated, patient-derived liquid biopsy-based platform (LIQBP). The LIQBP generally includes three main sections: a first section is an in vitro disease model; a second section is a cell cluster image processing and analytical tool; a third section is an image acquisition module.

In an exemplary embodiment, the in vitro disease model includes a microfluidic device.

In certain embodiments, the microfluidic device is a microfluidic biochip including at least two layers: a bottom layer comprised of a plurality of microwells each having an ellipsoidal base, and a top layer as a barrier layer. The bottom layer serves as cell cluster establishment, while the top layer serves to retain fluids and avoid mixing among different microwells.

To establish the in vitro disease model, each of the microwells is loaded with cell cultures isolated from liquid biopsy samples of different subjects or samples of the same subject but obtained at different treatment stages, depending on the application of the sample data. The microwells are configured to allow cell cluster formation, qualitative and quantitative assessments of the cell clusters directly by the image acquisition module, where the parameters being assessed include, but not limited to, morphology, cluster size, thickness, roughness, and compactness of the cell clusters.

In certain embodiments, the at least two layers of the microfluidic device are made of a flexible material such as thermoplastic material with certain flexibility.

In certain embodiments, the thermoplastic material for forming the at least two layers of the microfluidic device includes polydimethylsiloxane (PDMS).

In certain embodiments, the cell cultures are obtained from the liquid biopsy of one or more subjects and include circulating tumor cells and immune cells of the one or more subjects.

In certain embodiments, the cell cluster image processing and analytical tool includes a data augmentation module for optimizing image data obtained from the cell clusters by the image acquisition module and annotating thereof before being subject to deep learning or prediction by a corresponding neural network.

In certain embodiments, the image data obtained by the image acquisition module includes one or more of brightfield, dark-field, differential interference contrast, and phase-contrast microscopy images.

In certain embodiments, the image acquisition module is selected from a phase-contrast microscope.

In an exemplary embodiment, the cell cluster image processing and analytical tool comprises a fully automated neural network.

In other embodiments, the cell cluster image processing and analytical tool further comprises a user interface and a data augmentation module.

In certain embodiments, the data augmentation module is configured to optimize the images acquired by the image acquisition module such as horizontal flip, vertical flip, rotation, enlargement, random cropping, image gray scaling; normalize images of microwells and cell clusters; and annotate thereof before being fed to the corresponding neural network for training or prediction.

In certain embodiments, the corresponding neural network based on deep learning model includes ResUnet++ network and Resnet 34 network. Other neural networks based on deep learning model may also be used for the neural network of the present invention.

In certain embodiments, the one or more subjects include healthy donors and patients with a clinically diagnosed event or pathology.

In certain embodiments, the clinically diagnosed event or pathology is cancer or detectable tumor.

In certain embodiments, the patients are at different treatment stages of cancer progression including pre-treatment stage, and treatment cycles from 1 to 8.

In certain embodiments, the cancer patients may be stratified according to TNM cancer staging (i.e., T: size or direct extent of the primary tumor; N: degree of spread to regional lymph nodes; M: presence of distant metastasis) or overall cancer staging (i.e., 0 to IV).

In certain embodiments, the neural network is configured to perform image segmentation and classification to output a prediction. The neural network is also configured to implement flat-field correction, auto ellipse detection, edge detection, and morphology characterization algorithms on images acquired, optimized and annotated by the patient-derived liquid biopsy-based platform.

In certain embodiments, the set of image data for training and predicting a clinical prognosis by the neural network is a set of image data obtained from cell clusters formed in the microfluidic device of the platform originated from the liquid biopsy of one or more subjects and after being characterized in terms of different morphological parameters.

In certain embodiments, the different datasets for training the neural network include training dataset, validation dataset and test dataset.

In certain embodiments, the flat-field correction algorithm is implemented to normalize image data in order to obtain uniformly illuminated images.

In certain embodiments, the auto ellipse detection algorithm is implemented to identify region of interests (ROIs) including microwells.

In certain embodiments, images are cropped to tangent rectangles of the resultant ellipses corresponding to each of the microwell locations.

In certain embodiments, the edge detection algorithm is implemented to extract features from cropped region of interests (cROIs) including cell clusters within each of the microwells.

In certain embodiments, the identified cROIs are binarized to form binary images, followed by dilating, filling space within cell cluster with white pixels, and eroding sequentially to serve as a mask image for feature extraction.

In certain embodiments, the morphology characterization algorithm is implemented to extract features from the mask image including determining different morphological parameters in the cluster region.

In certain embodiments, the different morphological parameters includes cell cluster size, thickness, roughness and compactness.

In another aspect of the present invention, a method for predicting cancer stages of a subject based on cell cluster characteristics of a biological sample obtained from the subject is provided. The method includes:
  obtaining a liquid biopsy sample from a subject;
  isolating a nucleated cell fraction from the liquid biopsy sample;
  culturing the nucleated cell fraction in one or more microwells of a microfluidic device until cell clusters are formed;

acquiring images of the microwells by an image acquisition module in the absence of any labelling agents;

selecting images with the microwells;

cropping areas in the images with single microwell;

identifying presence of cell clusters in the cropped areas;

extracting different features from the identified cell clusters;

quantifying morphological parameters of the cell clusters from the extracted features;

outputting quantitative attributes of the morphological parameters and comparing thereof with a threshold of each of the morphological parameters in order to determine phenotype of the cells forming the cell cluster and predict disease prognosis of the subject associated with said phenotype.

In certain embodiments, the liquid biopsy is peripheral blood.

In certain embodiments, the microwells are configured to allow biological cells from the nucleated cell fraction to seed at a bottom of the microwells and form clusters thereon.

In certain embodiments, the bottom of the microwells is in ellipsoidal shaped.

In certain embodiments, the morphological parameters include cluster size, thickness, roughness and compactness.

In certain embodiments, the cell cluster size is determined based on edge detection and morphological image operations.

In certain embodiments, the cluster size is computed based on the percentage of white pixels and the scale of the microwell.

In certain embodiments, the cell cluster thickness is determined by an average gray value of the cell cluster with respect to a maximum gray value of each microwell.

In certain embodiments, an average gray value, the highest gray value, and a higher normalized standard deviation ($nSD^{GV}$) in the masked image are computed. The average gray value is normalized to the highest gray value to generate normalized gray value (nGV) in order to determine the cluster thickness. The lower the nGV is, the thicker is the cell cluster.

In certain embodiments, the cell cluster roughness is determined by a normalized standard deviation of gray value ($nSD^{GV}$) or a ratio of normalized gray value to the normalized standard deviation of the gray value of the cell clusters (RGVSD).

In certain embodiments, the cell cluster roughness is used to determine a percentage of positive cell clusters with respect to a clinical event and a percentage of samples in one or more clinical cohorts. The degree of roughness in terms of the $nSD^{GV}$ also indicates the degree of heterogeneity in the cell cluster. In other words, the higher the $nSD^{GV}$ is, the higher percentage of the cells is tumor-associated cells such as tumor-associated immune cells.

In certain embodiments, the cell cluster compactness is determined by a ratio of normalized gray value to cluster size (RGVS).

In certain embodiments, the cell cluster compactness is used to determine the cancer stages of the patient. In other words, the lower the RGVS is, the more advanced is the cancer stage of the subject.

In a further aspect of the present invention, there is provided a method for training a neural network based on one or more deep learning models for patient phenotyping and predicting disease prognosis of a subject based on cell cluster image datasets obtained from an in vitro disease model derived from liquid biopsy samples of subjects from different cohorts. The method includes:

providing the in vitro disease model established on a microfluidic device;

acquiring cell cluster images from different liquid biopsy samples at more than one magnification powers of microscopy in the absence of any labelling agent;

identifying region of interest from the cell cluster images;

resizing the cell cluster images according to the identified region of interest;

annotating the resized cell cluster images according to the presence or absence of cell clusters in the identified region of interest;

preparing corresponding datasets for training different sections of the neural network;

loading the corresponding datasets to the neural network for training image segmentation and classification, respectively.

In certain embodiments, the neural network includes a segmentation section and a classification section.

In certain embodiments, the cell cluster image datasets include segmentation datasets and classification datasets.

In certain embodiments, the ResUnet++ network is selected for performing image segmentation.

In certain embodiments, the Resnet 34 network is selected for performing image classification.

In certain embodiments, the image classification is performed based on a scale-invariant feature transform (SIFT) method.

In certain embodiments, the corresponding datasets include quantitative attributes of morphological characteristics of the cell clusters including cluster size, thickness and roughness reflected by nGV, $nSD^{GV}$, and RGVS of the cell clusters.

In certain embodiments, the corresponding datasets are stored in a database for training the neural network or to be recalled for subsequent prediction of disease prognosis of a patient.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Other aspects of the present invention are disclosed as illustrated by the embodiments hereinafter.

BRIEF DESCRIPTION OF DRAWINGS

The patent or application file contains at least one drawing executed in color. Copies of this patent or patent application publication with color drawing(s) will be provided by the Office upon request and payment of the necessary fee.

The appended drawings, where like reference numerals refer to identical or functionally similar elements, contain figures of certain embodiments to further illustrate and clarify the above and other aspects, advantages and features of the present invention. It will be appreciated that these drawings depict embodiments of the invention and are not intended to limit its scope. The invention will be described and explained with additional specificity and detail through the use of the accompanying drawings in which:

FIG. 7A depicts as a flowchart an overview of how to train and use the neural network of the present invention to predict disease prognosis based on the data obtained and processed by the in vitro disease model from clinical samples of different cohorts;

FIG. 7B depicts as a flowchart how the data obtained and processed by the in vitro disease model is segregated into different datasets for classification training of the neural network;

FIG. 7C depicts as a flowchart how the data obtained and processed by the in vitro disease model is segregated into different datasets for segmentation training of the neural network;

FIG. 7D depicts as flowcharts an overview of how classification and segmentation trainings of the neural network based on different datasets are performed, respectively;

FIG. 7E depicts as a flowchart how a trained neural network determines phenotype of cells from liquid biopsy of a subject based on identifying and measuring size of each of the microwells with positive cell cluster in order to predict disease prognosis according to certain embodiments of the present invention;

Skilled artisans will appreciate that elements in the figures are illustrated for simplicity and clarity and have not necessarily been depicted to scale.

DEFINITION

The term "TA" described herein refers to cluster thickness per area.

The term "LIQBP" described herein refers to liquid biopsy-based platform.

The term "ROI" described herein refers to region of interest for identifying microwells in the images.

The term "CROI" described herein refers to cropped region of interest for identifying cell clusters in the images.

The term "nGV" described herein refers to normalized gray value of cluster images.

The term "nSDGV" described herein refers to normalized standard deviation of gray value of cluster images.

The term "RGVSD" described herein refers to a ratio of the normalized gray value to the normalized standard deviation of gray value of cluster images.

The term "RGVS" described herein refers to a ratio of normalized gray value of cluster images to cluster size.

The term "PDMS" described herein refers to polydimethylsiloxane.

The term "PLA" described herein refers to polylactic acid.

The term "DMEM" described herein refers to Dulbecco's Modified Eagle Medium.

The term "FBS" described herein refers to Fetal Bovine Serum.

The term "SIFT" described herein refers to scale-invariant feature transform method or technique to calculate the number of key points for each microwell.

The term "LIME" described herein refers to local interpretable model-agnostic explanations which is a protocol capable to explain what machine learning classifiers are doing.

The abbreviation "T" used in the term "TNM staging" described herein refers to the size or direct extent of the primary tumor.

The abbreviation "N" used in the term "TNM staging" described herein refers to the degree of spread to regional lymph nodes, or the degree of regional lymph nodes metastasis.

The abbreviation "M" used in the term "TNM staging" described herein refers to presence of distant metastasis.

DETAILED DESCRIPTION OF THE INVENTION

It will be apparent to those skilled in the art that modifications, including additions and/or substitutions, may be made without departing from the scope and spirit of the invention. Specific details may be omitted so as not to obscure the invention; however, the disclosure is written to enable one skilled in the art to practice the teachings herein without undue experimentation.

Establishment of Patient-Derived Liquid Biopsy Tumor Model

Figure 1A:
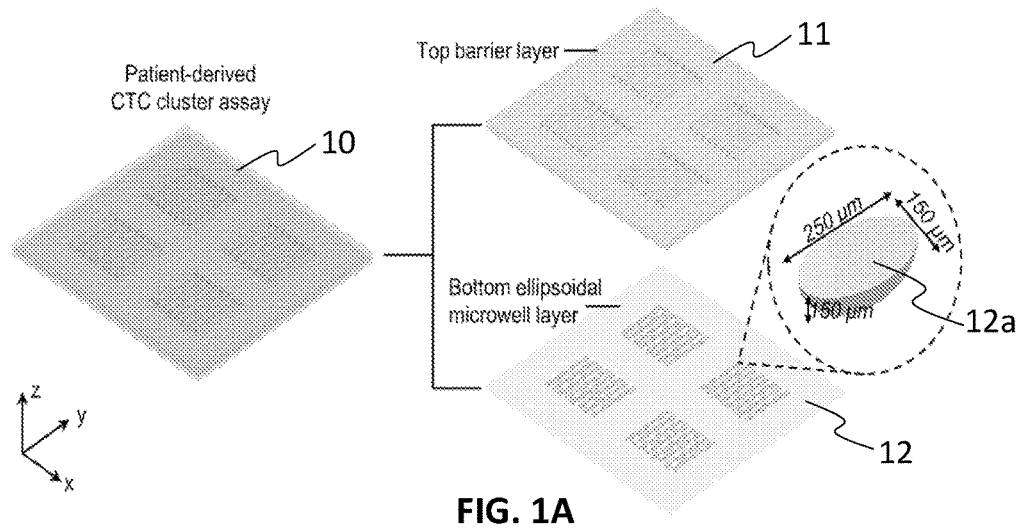
FIG. 1A schematically depicts the in vitro disease model according to certain embodiments of the present invention, where the inset shows an example of a microwell of a bottom layer of the in vitro disease model with dimension.
Figure 1B:
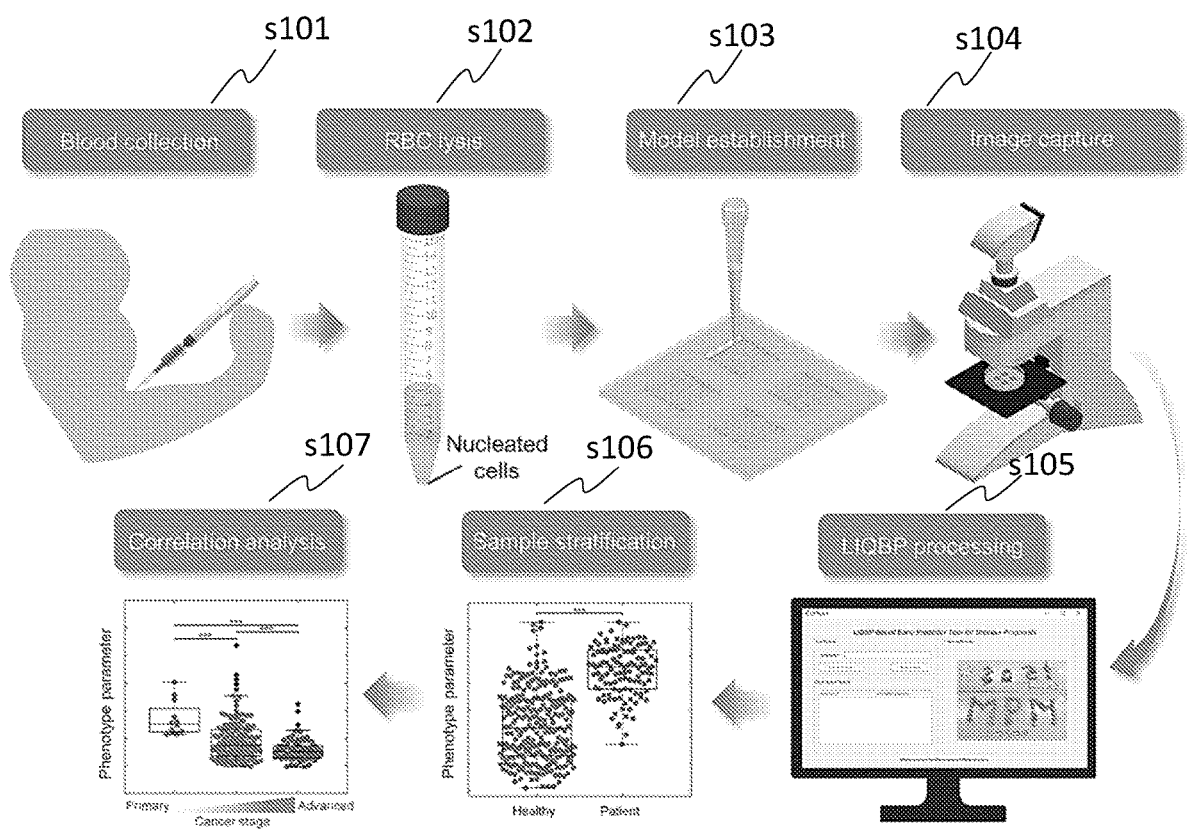
FIG. 1B schematically depicts a workflow of establishing a patient-derived liquid biopsy disease model according to certain embodiments of the present invention.
Figure 1C:
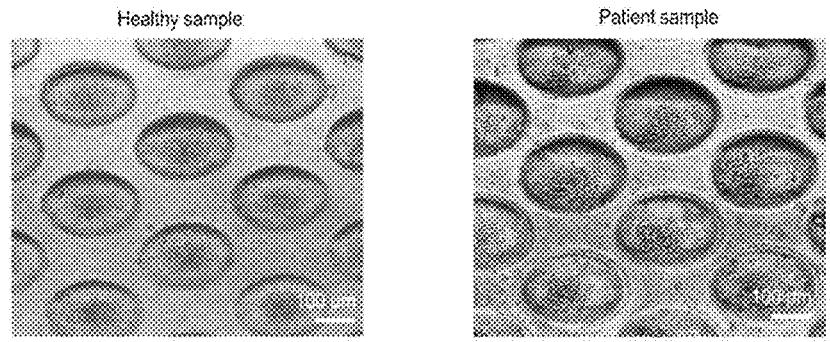
FIG. 1C shows two grayscale images taken by an image acquisition module of the present invention to demonstrate morphological differences between cell clusters formed from samples of healthy donors (left) and patients clinically diagnosed with cancer (right); scale bar: 100 μm.

Turning to FIGS. 1A-1C, a patient-derived CTC cluster model is established s103 on a microfluidic device, e.g., a microfluidic biochip 10 in four arrays of microwells in this example. Patient's liquid biopsy is collected from peripheral blood sample of a subject s101, red blood cells are removed from the blood sample by cell lysis s102, followed by loading the rest of the blood sample (i.e., the nucleated cell fraction after RBCs lysis) into a corresponding microwell s103 at a bottom layer 12 of the microfluidic device 10. Each of the microwells is configured to accommodate the CTCs and other immune cells from the patient's liquid biopsy to seed on the bottom of the microwell and form clusters thereon. In this example, each of the microwells 12a can be in ellipsoidal shape having a dimension of 250 μm (L)×150 μm (W)×150 μm (D), as shown in inset of FIG. 1A. Each of the arrays in this example contains eight channels and each channel contains 300 microwells. Therefore, each microfluidic biochip according to the configuration of this example can handle up to about 9,600 samples at each instance. For tumor model derived from CTCs, cell clusters can be formed within about 14 days from when the viable cells from the sample are collected and loaded into the microwells. The top layer 11 serves as a barrier to avoid mixing of the loadings between channels of the same array in the microfluidic device.

After the tumor model is established on the microfluidic device s103, the microfluidic device will be subject to imaging s104 to locate cell cluster regions and quantify some morphological characteristics from label-free cell cluster images. Since the analytical tool of the present invention relies on different grayscale in different regions of the images to identify and characterize certain phenotype of the cells in the cell cluster, instead of detecting the presence and quantifying the intensity of certain luminescence representing one or more biomarkers, the images of the microwells containing cell clusters captured by the imaging device can be simply taken by a typical phase-contrast microscope to obtain phase contrast, bright-field, dark-field, or differential interference contrast images. Thus, no labeling agents or specific light filters are required for imaging of the cell clusters in the present invention.

After capturing microwell images by the imaging device s104, the captured images will be processed by a fully automated analytical tool to conduct multiple phenotype analyses in terms of different morphological parameters, mainly including cluster size, thickness, roughness and compactness of the cell cluster s105. This analytical tool is preferably established based on a neural network with one or more deep learning models to be able to learn, simulate, and remodel from different datasets obtained from corresponding subjects of different cohorts including healthy cohort and disease cohort of a particular cancer at different treatment stage or progression. In this example, the platform may include a computer program and a user interface (e.g., a user terminal such as a network computer, any portable device capable of running the computer program for executing the corresponding analyses on numerous image datasets).

Different features are then extracted from the captured images based on the morphological parameters by the platform to determine which phenotype the majority of the cells from a liquid biopsy belongs to, in order to differentiate between healthy and diseased individuals (sample stratification, s106).

The analytical tool is also capable to determine the stage of the patient or evaluate the prognosis of certain treatment regime or cycle from the same extracted features of the captured images with respect to the correlation between a corresponding morphological parameter and a particular stage or class (e.g., TNM staging) of cancer or tumor (s107).

Figure 2A:
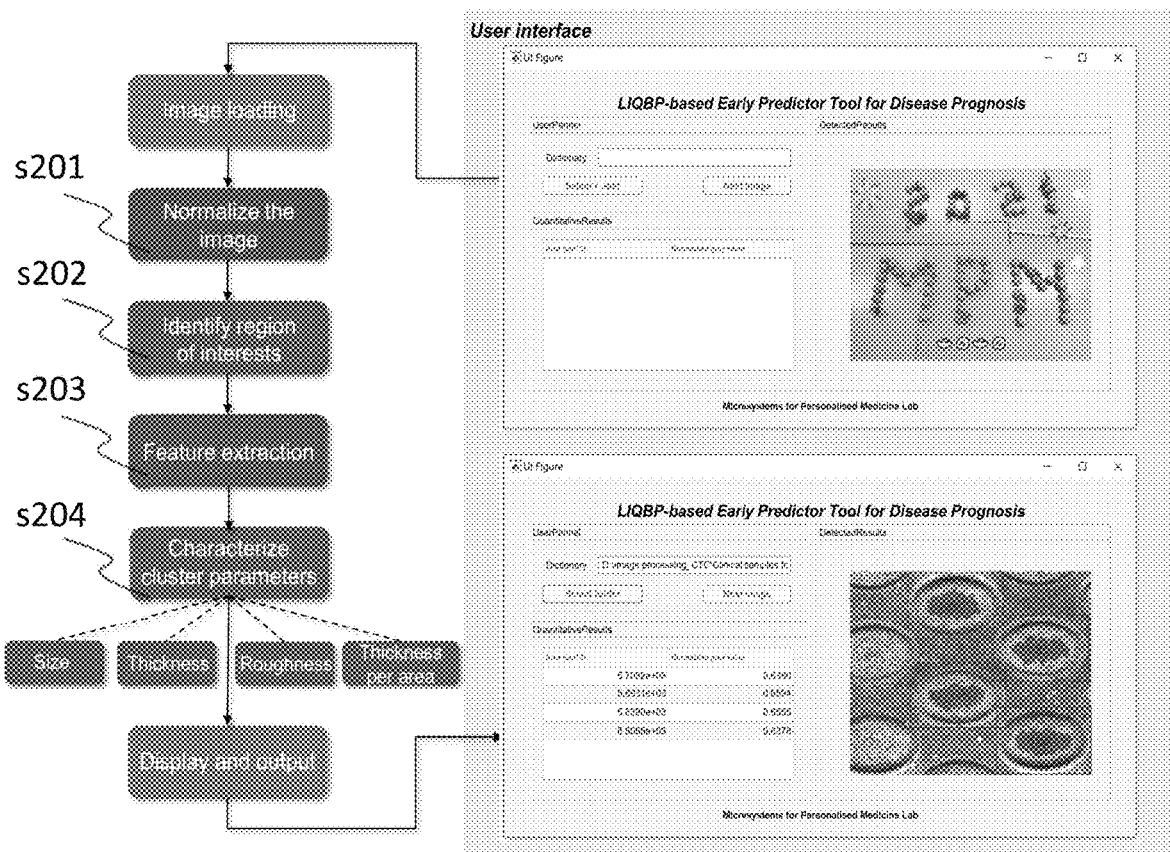
FIG. 2A shows a label-free phenotyping analysis workflow (left) and a user interface (right) of an example of the patient-derived liquid biopsy disease model for early prediction of disease prognosis according to certain embodiments of the present invention.

Image Processing by LIQBP for Training of Deep Learning Neural Network and Subsequent Prognosis Prediction Turning to FIGS. 2A-2E, the captured images of microwells containing cell clusters by the LIQBP are subject to the following optimizations and annotations before phenotyping and prediction of prognosis: (s201) Normalizing images by flat field background correction to achieve a uniformly illuminated image; (s202) Using the auto-ellipse detection algorithm to identify the region of interests (ROIs; microwells), where images can be cropped to multiple tangent rectangles of the resultant ellipses that correspond to the microwell locations to generate cropped region of interests (cROIs); (s203) Feature extraction to identify clusters in the cROIs within the microwells, where an edge detection-based algorithm is implemented for locating, dilating, filling, eroding, and binarizing the cluster region and; (s204) Parameter characterization, including characterizing cluster size, thickness, roughness, and compactness of the cell clusters identified in the cROIs (FIG. 2A).

Figure 2B:
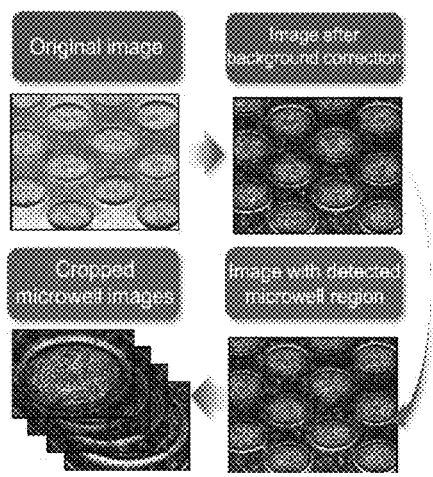
FIG. 2B shows a workflow of feature extraction from identified region of interests (ROIs) of cell cluster images according to certain embodiments of the present invention.

To obtain quantitative attributes of the cell clusters, a file dictionary of the test images is initially selected in the user interface. The parameter outputs should be automatically obtained. Specifically, a flat-field background correction algorithm is implemented for normalizing the test images (FIG. 2B). In one example, Gaussian filter can be used to extract the background signal such that the background signal would be subtracted from the test images.

Figure 2C:
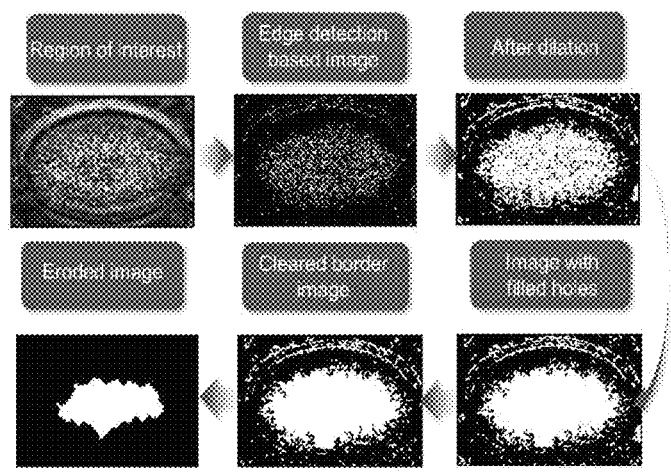
FIG. 2C shows a workflow of identifying cell clusters from the ROIs identified according to the workflow as shown in FIG. 2B, and optimizing the images with the identified cell clusters to transform into binary images according to certain embodiments of the present invention.

After normalization, microwell regions (ROIs) in the test images are located by implementing an auto-ellipse detection algorithm (FIGS. 2B and 2C). Cropping of the images to display individual microwells is fully automated because morphologically the cell clusters formed by a heterogeneous cell mixture (e.g., a mixture of tumor-associated immune cells and CTCs) are shown to be less compact than those formed by homogenous cancer cells (e.g., spheroids). With an aid of edge detection-based algorithm (e.g., based on Sobel operators), space within the cell cluster (represented by white pixels) are filled in white pixels to form closed polygons, while connected objects at the boundary will be removed to remove the noise pixels. By using linear structure elements, the images are further eroded such that the microwell area is marked in white, while the non-microwell area is marked in black.

Figure 2D:
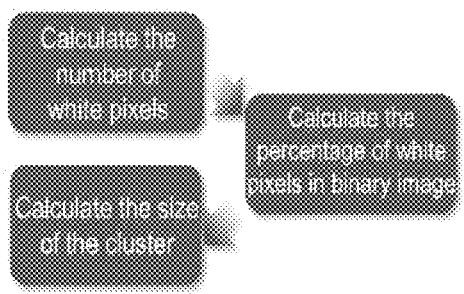
FIG. 2D shows a workflow of calculating cell cluster size from the optimized images prepared according to the workflow as shown in FIG. 2C.

Turning to FIG. 2D, the number of white pixels $N_w$ and the total number of pixels $N_t$ are determined by using the processed binary images. Following which, as the length and width of each microwell are fixed, the size of the cell cluster can be determined by the following Equation (1):

$$S = \frac{N_w}{N_t} \times L_m \times W_m \tag{1}$$

where S represents the cluster size, $L_m$ and $W_m$ are constants (250 µm and 150 µm) and represent the length and width of microwells, respectively.

Figure 2E:
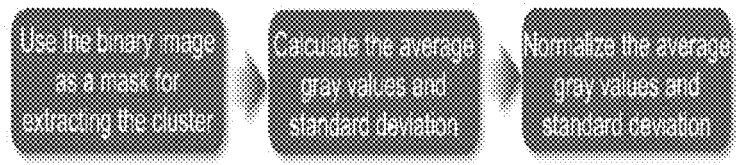
FIG. 2E shows a more detailed workflow of calculating normalized gray value (nGV) of the identified cell clusters from the optimized images and with respect to the calculated cluster size according to the workflow as shown in FIG. 2D.

The final processed binary images are converted to grayscale, and the gray values are obtained to extract the cell cluster area (FIG. 2E). Regions with higher gray values indicate the presence of more transmitted light, reflecting less or substantially no cells.

In certain embodiments, cluster thickness is determined by a normalized gray value (nGV), which represents the amount of light transmitted through the cell cluster. To eliminate fluctuations in the maxima and minima of gray values due to imaging technique or microscope variation, the nGV is obtained relative to the maxima obtained from each microwell. An nGV approaching 0 would reflect the presence of clusters with thicker cell layers.

In certain embodiments, cluster roughness is defined by the standard deviation of the gray value ($SD^{GV}$). If the $SD^{GV}$ is large, the surface of the cluster will be rougher, reflecting the presence of cell clusters formed from patient samples. A higher normalized $SD^{GV}$ ($nSD^{GV}$) reflects an increased heterogeneity within the clusters due to the presence of tumor-associated immune cells.

In certain embodiments, cluster compactness is determined by a ratio of nGV to cluster size (RGVS). A lower RGVS correlates with the presence of more compact cell clusters, reflecting the presence of more cells at advanced cancer stages.

Clinical Validation with Patient-Derived LIQBP

Figure 3A:
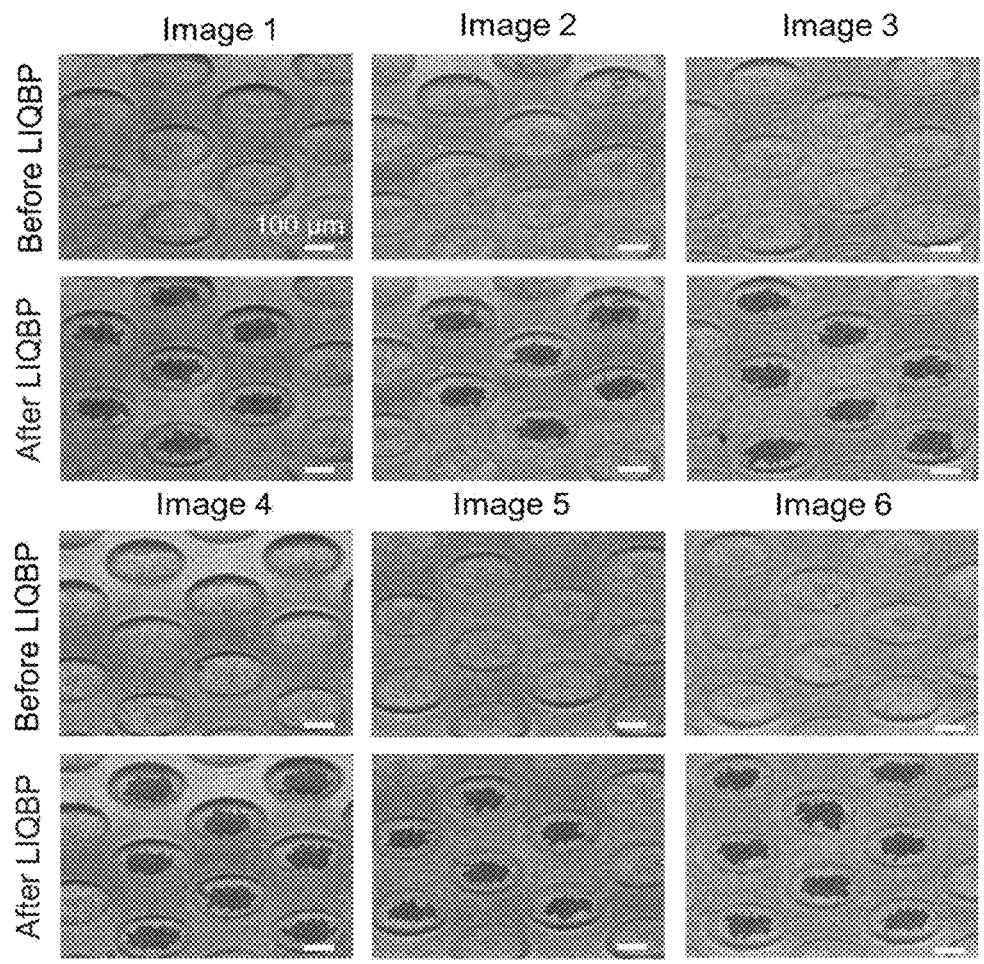
FIG. 3A shows grayscale images of microwells of the bottom layer of the biological sample tool before and after culturing circulating tumor cells (CTCs) from liquid biopsy of a subject; blue shades represent cell clusters from the grayscale images detected by a cell cluster identification method according to certain embodiments of the present invention; sample size: n=6; scale bar: 100 μm.
Figure 3B:
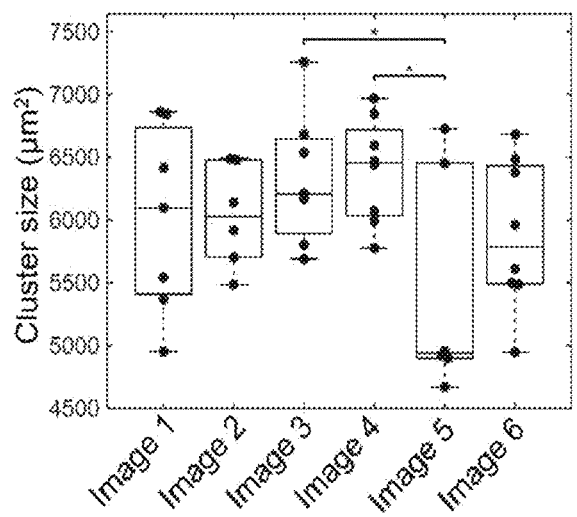
FIG. 3B shows boxplots of the calculated cluster size of the CTCs from the images as shown in FIG. 3A; * represents p≤0.05.
Figure 3C:
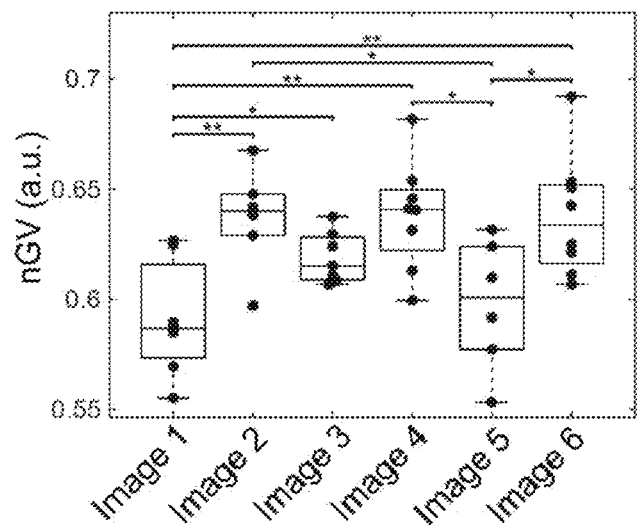
FIG. 3C shows boxplots of the calculated nGV of the CTC clusters from the images as shown in FIG. 3A; ** represents p≤0.01; * represents p≤0.05.
Figure 3D:
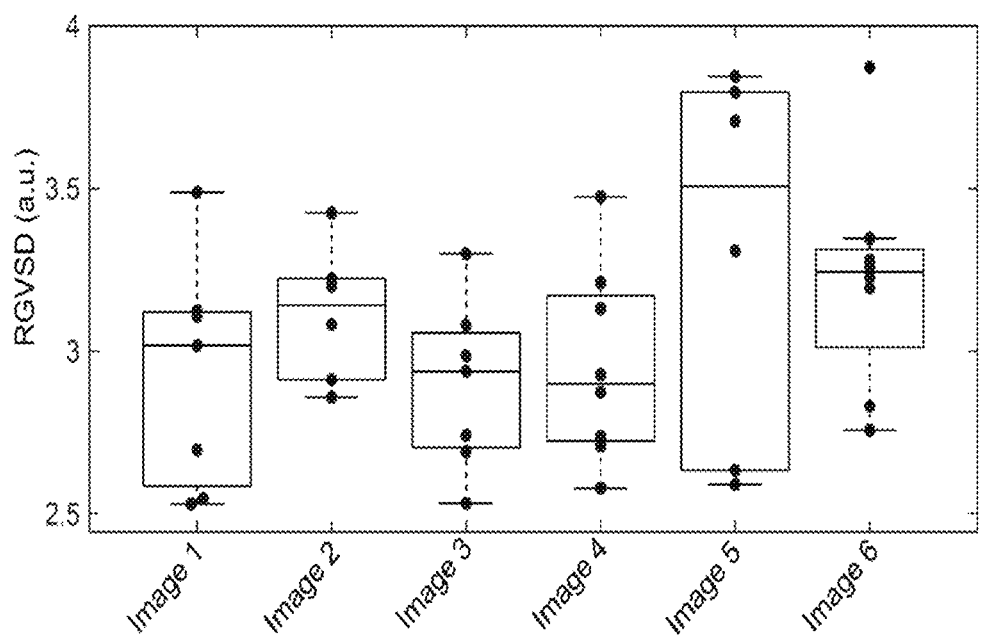
FIG. 3D shows boxplots of a ratio of the calculated nGV in FIG. 3C to the calculated cluster size in FIG. 3B (RGVS) of the CTC clusters as shown in the images of FIG. 3A.

Turning to FIGS. 3A to 3D, to validate the clinical utility of the LIQBP, six images of clusters derived from clinical samples of the same patient are randomly selected to determine cluster size, nGV, and RGVS, respectively. The region of interests (ROIs) are first located (blue shades) on the images after processing by the LIQBP (FIG. 3A). Heterogeneity of patient samples is reflected by their slight variation in cluster size and nGV (p>0.01) (FIGS. 3B and 3C). However, the RGVS parameter is relatively constant across clusters of the same sample (FIG. 3D), validating the robustness of the LIQBP for the evaluation of clinical samples.

Differentiation Between Healthy and Patient Phenotypes by LIQBP

Turning to FIGS. 4A to 4F, to evaluate the performance of the LIQBP in differentiating healthy donors from cancer patients simply based on a label-free liquid biopsy tumor model, peripheral blood samples (n=9) are collected from healthy people (n=5) (Table 1: sample nos. 1-5) and cancer patients (pretreatment; n=4) (Table 1: sample nos. 10, 15, 16 and 27) for culture in the microfluidic device of the LIQBP to perform subsequent phenotyping.

TABLE 1

Figure 4A:
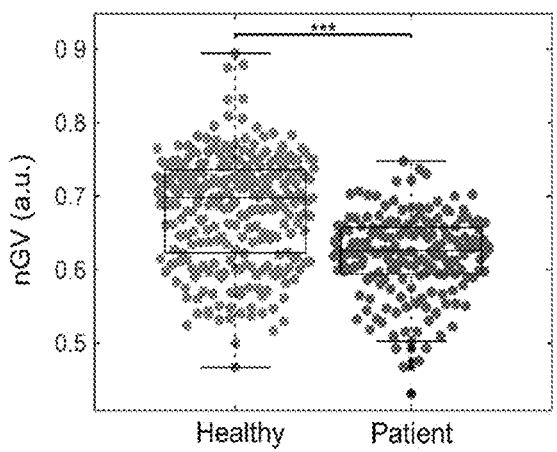
FIG. 4A shows boxplots of calculated nGV from gray scale images of identified cell clusters formed by liquid biopsy of two cohorts: healthy donors and patients clinically diagnosed with cancer; *** represents p≤0.001.
Figure 4B:
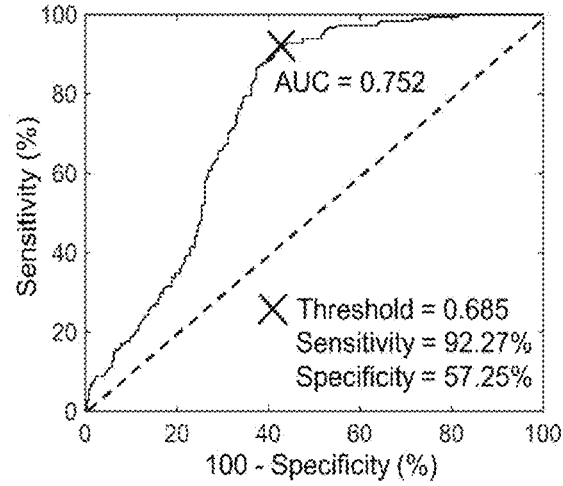
FIG. 4B shows the resultant area under the curve (AUC), threshold, sensitivity and specificity analyses of the calculated nGV of the two cohorts as shown in FIG. 4A.
Figure 4C:
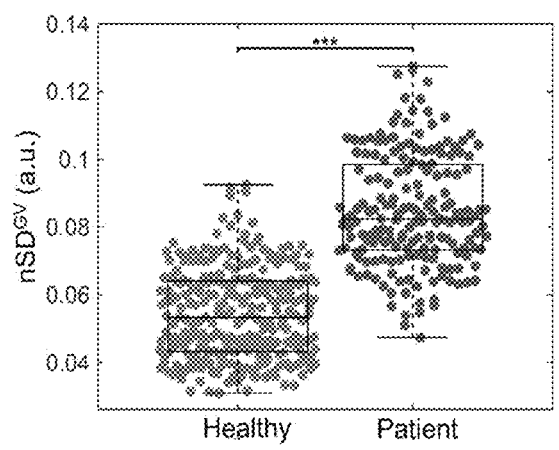
FIG. 4C shows boxplots of calculated normalized standard deviation of gray value ($nSD^{GV}$) from gray scale images of identified cell clusters formed by liquid biopsy of two cohorts: healthy donors and patients clinically diagnosed with cancer; *** represents p≤0.001.
Figure 4D:
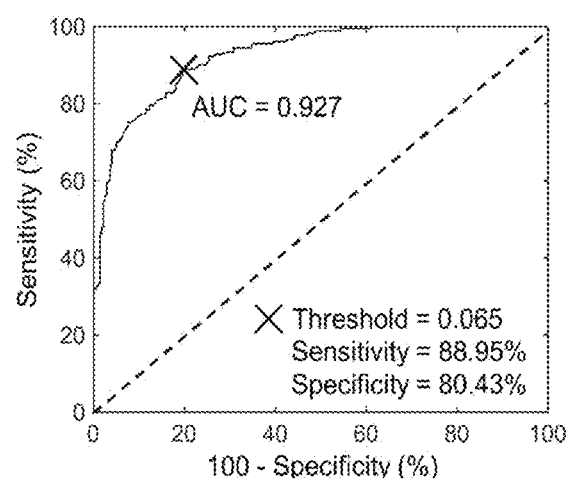
FIG. 4D shows the resultant AUC, threshold, sensitivity and specificity analyses of the calculated $nSD^{GV}$ of the two cohorts as shown in FIG. 4C.
Figure 4E:
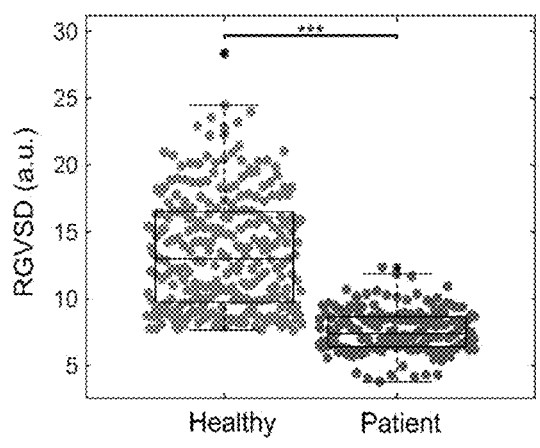
FIG. 4E shows boxplots of a ratio between nGV and $nSD^{GV}$ (RGVSD) for the two cohorts as shown in FIG. 4A and FIG. 4C, respectively; *** represents p≤0.001.
Figure 4F:
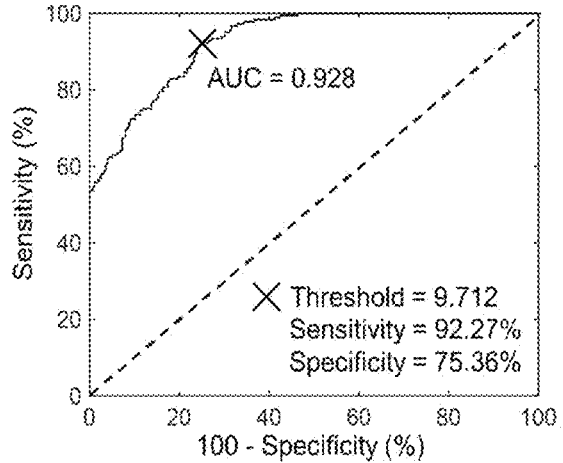
FIG. 4F shows a resultant AUC, threshold, sensitivity and specificity analyses of the calculated RGVSD of the two cohorts as shown in FIG. 4E.

| Sample No. | Cancer type | TNM stage | Cancer stage (0 to IV) | Treatment cycle | Age | Gender |
|---|---|---|---|---|---|---|
| 1 | Healthy | — | — | — | 48 | Male |
| 2 | Healthy | — | — | — | 65 | Female |
| 3 | Healthy | — | — | — | 62 | Male |
| 4 | Healthy | — | — | — | 36 | Female |
| 5 | Healthy | — | — | — | 39 | Male |
| 6 | Gastric | pT4N2M0 | IIIA | 1 | 69 | Female |
| 7 | Gastric | pT4N2M0 | IIIB | 1 | 69 | Male |
| 8 | Gastric | pT2N0M0 | IB | 1 | 53 | Female |
| 9 | Gastric | pT3N3M0 | IIIB | 1 | 63 | Male |
| 10 | Breast | pT2N3M0 | IIIC | Pretreatment | 42 | Female |
| 11 | Breast | pT2N0M0 | IIA | 1 | 64 | Female |
| 12 | Breast | pT2N1M0 | IIB | 1 | 57 | Female |
| 13 | Breast | pT1N0M0 | IA | 1 | 50 | Female |
| 14 | Breast | cT2N3M0 | IIIC | 3 | 49 | Female |
| 15 | Colon | pT3N0M0 | IIA | Pretreatment | 67 | Female |
| 16 | Colon | pT1N1bM0 | IIIA | Pretreatment | 71 | Female |
| 17 | Lung | pT2N2M1 | IVB | 4 | 44 | Female |
| 18 | Pancreas | cT3N0M1 | IV | 4 | 51 | Male |
| 19 | Gastric | pT3N1M0 | IIIC | 6 | 50 | Male |
| 20 | Gastric | pT4N3M0 | IIIC | 3 | 73 | Female |
| 21 | Gastric | pT3N3M1 | IV | 1 | 68 | Male |
| 22 | Gastric | pT4N3M1 | IV | 1 | 65 | Male |
| 23 | Gastric | pT3N2M0 | IIIA | 5 | 59 | Male |
| 24 | Gastric | pT4aN3bM0 | IIIC | 5 | 50 | Male |
| 25 | Gastric | pT3N0M0 | IIA | 8 | 61 | Female |
| 26 | Gastric | pT4N2M1 | IV | 7 | 40 | Female |
| 27 | Breast | — | — | Pretreatment | 78 | Female |
| 28 | Breast | pT1N0M0 | IA | 3 | 56 | Female |
| 29 | Breast | pT2N0M0 | IIA | 5 | 73 | Female |
| 30 | Breast | pT1N0M0 | IA | 6 | 46 | Female |
| 31 | Breast | pT2N3M1 | IV | 5 | 51 | Female | p = pathological, c = clinical, T = size or direct extent of the primary tumor, N = degree of spread to regional lymph nodes, M = presence of distant metastasis Based on images obtained from healthy and patient sample cohorts, nGV, nSD$^{GV}$, and the RGVSD are determined (FIGS. 4A, 4C and 4E, respectively). High nGVs (>0.685) reflects the presence of thin clusters. Compared with the healthy cohort, the clusters from the patient cohort are shown to have significantly lower nGVs, higher nSD$^{GV}$, and lower RGVSD (nGVs$^-$/nSD$^{GV+}$/RGVSD$^-$), reflecting the presence of thick and rough clusters. The RGVSD parameter is shown to be the most critical in stratifying between patient and healthy cohorts.

Next, receiver operating characteristic (ROC) is analyzed by obtaining the area under the curve (AUC) (FIGS. 4B, 4D and 4F corresponding to FIGS. 4A, 4C and 4E). the AUCs of nGV, nSD$^{GV}$, and RGVSD are 0.752, 0.927, and 0.928, respectively. The highest AUC among the three parameters verifies that the RGVSD has the best performance in distinguishing between healthy donors and cancer patient cohorts. The thresholds are determined by Youden's index that maximizes sensitivity and specificity. LIQBP is shown to have a sensitivity and specificity of 92.27% and 57.25% to distinguish healthy and patient samples based on an nGV threshold set at 0.685. The sensitivity and specificity of LIQBP based on cluster roughness are significantly improved to 88.95% and 80.43%, respectively, at the nSD$^{GV}$ threshold of 0.065. The sensitivity and specificity of LIQBP based on RGVSD are 92.27% and 75.36%, respectively, at the RGVSD threshold of 9.712.

Overall, the high AUC (0.869±0.083), sensitivity (91.16±1.56%), and specificity (71.01±9.95%) of these parameters validate the use of thickness, roughness, and RGVSD as efficient indexes for distinguishing between the healthy donors and cancer patient cohorts. Further stratification based on these thresholds (nGV: <0.685, nSD$^{GV}$: >0.065 and RGVSD: <9.712) can identify patients with worsening prognosis.

Figure 5A:
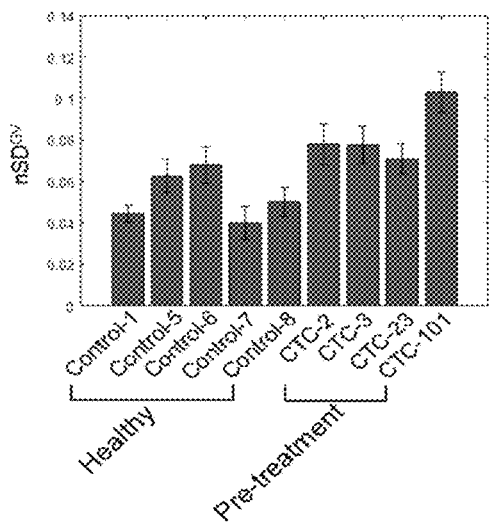
FIG. 5A shows $nSD^{GV}$ of samples according to Table 1 from healthy cohort (n=5) and pre-treatment disease cohort (n=4)
Figure 5B:
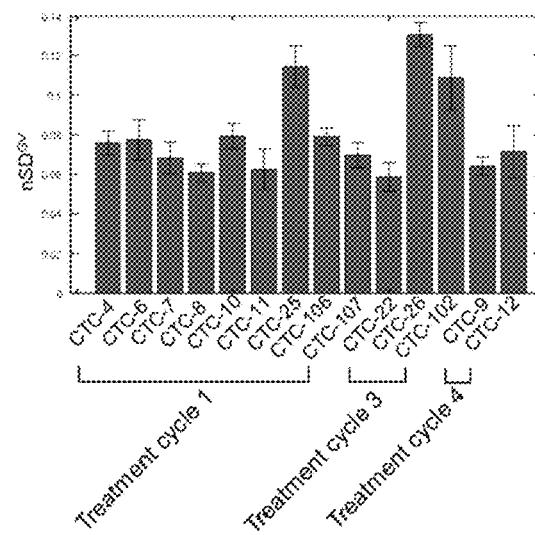
FIG. 5B shows $nSD^{GV}$ of samples according to Table 1 from disease cohorts at different post-treatment cycle: treatment cycle 1 (n=9); treatment cycle 3 (n=3); treatment cycle 4 (n=2)
Figure 5C:
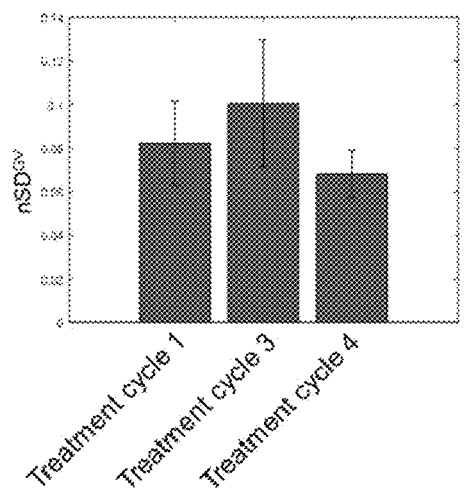
FIG. 5C shows an average $nSD^{GV}$ of samples in each of the treatment cycles 1, 3 and 4 as shown in FIG. 5B.

To further demonstrate the ability of the LIQBP in stratifying different post-treatment cohorts and identifying patients with worsening prognoses during post-treatment stages, the percentage of positive clusters in each sample and the percentage of positive samples in each post-treatment cohort are calculated. Similarly, nSD$^{GV}$ of the healthy (Table 1: sample nos. 1-5), pretreatment (Table 1; sample nos. 10, 15, 16 and 27), and post-treatment samples (Table 1: sample nos. 6-9, 11-14, 17, 18, 20-22, and 28) are calculated to reflect the roughness of the patient-derived cell clusters (FIGS. 5A and 5B). Compared with the healthy cohort (0.054±0.013), nSD$^{GV}$ of the pretreatment patient cohort (0.085±0.017) is significantly higher (p<0.001, 1.57 folds), demonstrating the clusters derived from the pretreatment cohort are rougher than the clusters from the healthy cohort. For the post-treatment samples, nSD$^{GV}$ of the advanced treatment cycle (cycle 4) is significantly lower (1.21 folds and 1.47 folds) than the early treatment cycles (cycle 1 and 3) (FIG. 5C), verifying that clusters from early treatment cycles are rougher than the clusters derived from advanced treatment cycles.

Figure 5D:
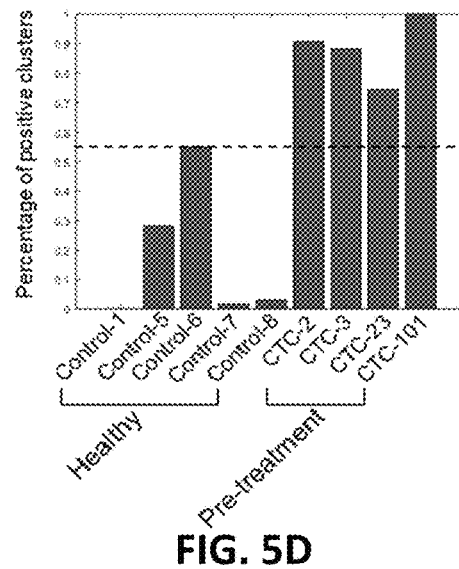
FIG. 5D shows percentage of positive cell clusters of samples according to Table 1 from healthy cohort (n=5) and pre-treatment disease cohort (n=4)
Figure 5E:
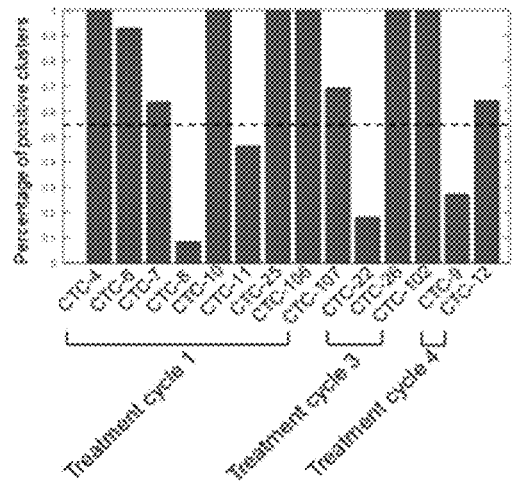
FIG. 5E shows percentage of positive cell clusters of samples according to Table 1 from disease cohort at different post-treatment cycle: treatment cycle 1 (n=9); treatment cycle 3 (n=3); treatment cycle 4 (n=2)
Figure 5F:
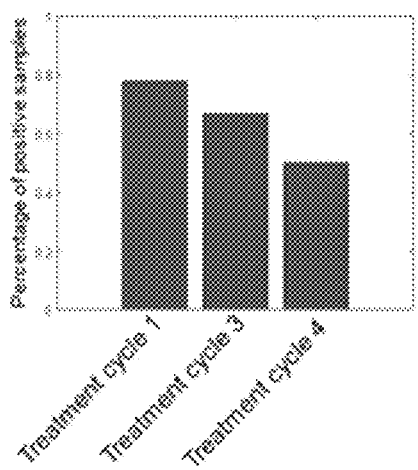
FIG. 5F shows an average percentage of positive cell clusters of samples in each of the treatment cycles 1, 3 and 4 as shown in FIG. 5E.

In addition, the nSD$^{GV}$ threshold (0.065) can be used to classify positive and negative clusters. Positive clusters are defined as the clusters with nSD$^{GV}$ higher than the threshold (0.065), and the opposite are defined as the negative clusters. Then, the percentage of positive clusters in each sample from healthy, pretreatment, and post-treatment cohorts are calculated (FIGS. 5D and 5E). The maximum positive clusters percentage in healthy samples from the healthy cohort was defined as the threshold (0.55) for distinguishing the positive and negative samples. Samples with positive cluster percentages above the threshold (0.55) were considered positive samples. Eventually, the percentage of the positive sample in each treatment cycle cohort is calculated (FIG. 5F). As the number of treatment cycles increases, the percentage of the positive samples significantly decreases, demonstrating an inverse correlation of positive samples percentage with treatment cycles.

Correlation Between RGVS and Treatment Cycles

Figure 6A:
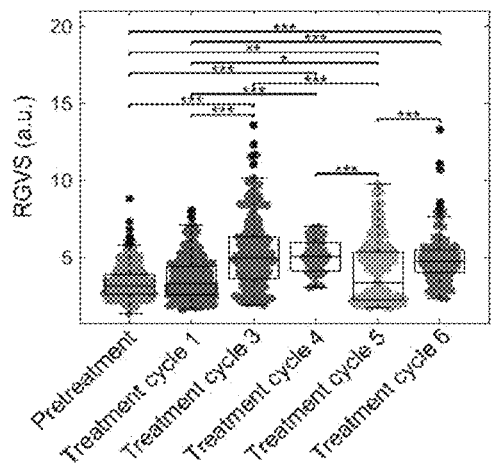
FIG. 6A shows boxplots of RGVS of samples according to Table 1 from disease cohorts at pre-treatment stage and different treatment cycle; * represents p≤0.001,  represents p≤0.01, and * represents p≤0.05.
Figure 6B:
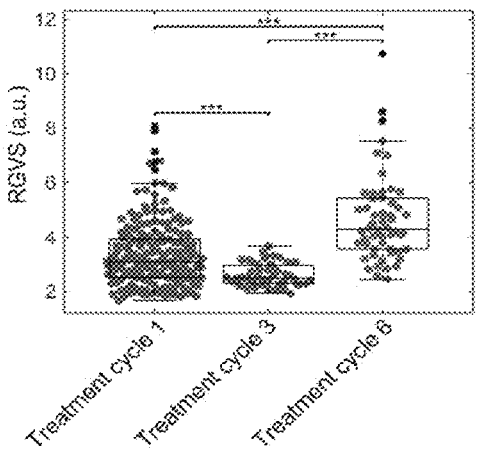
FIG. 6B show boxplots of RGVS of different gastric cancer samples (n=8) according to Table 1 at pre-treatment stage and different treatment cycle; * represents p≤0.001,  represents p≤0.01, and * represents p≤0.05.
Figure 6C:
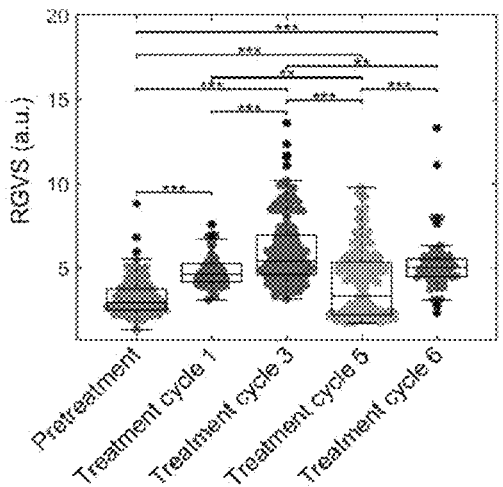
FIG. 6C show boxplots of RGVS of different breast cancer samples (n=10) according to Table 1 at pre-treatment stage and different treatment cycle; * represents p≤0.001,  represents p≤0.01, and * represents p≤0.05.

Turning to FIGS. 6A-6C, to study the correlation between cluster parameters and patient prognosis, clinical samples of liquid biopsy from cancer patients throughout their treatment (n=22) (Table 1: sample nos. 6-22, 27-31). Four samples with non-optimal optical images are not included in the analysis. Patients who are ready to undergo or already have undergone four treatment cycles are namely pretreatment (n=4), treatment cycle 1 (n=9), treatment cycle 3 (n=3), treatment cycle 4 (n=2), treatment cycle 5 (n=2), and treatment cycle 6 (n=2), respectively. Parameters, including the cluster size, nGV, and RGVS, are determined. The RGVS against different treatment groups in terms of treatment cycle number are shown in FIG. 6A: pretreatment (3.45±1.15), treatment cycle 1 (3.63±1.31), treatment cycle 3 (5.29±2.27), treatment cycle 4 (5.08±1.02), treatment cycle 5 (4.02±2.02), and treatment cycle 6 (4.97±1.66).

Figure 6D:
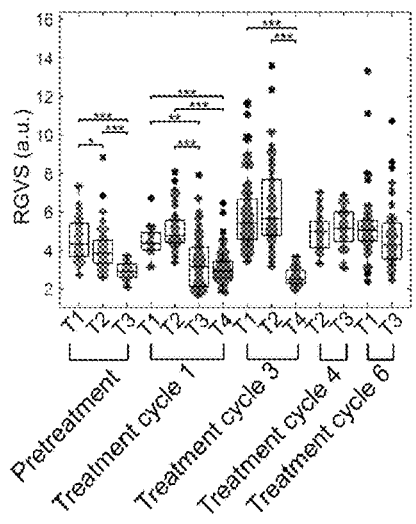
FIG. 6D shows boxplots of the RGVS of positive clusters from 19 clinical samples at pre-treatment and different post-treatment cycles (1, 3, 4, and 6) against different sizes of primary tumor (T staging): pretreatment (n=3), treatment cycle 1 (n=9), treatment cycle 3 (n=3), treatment cycle 4 (n=2), and treatment cycle 6 (n=2); * represents p≤0.001;  represents p≤0.01; * represents p≤0.05.
Figure 6E:
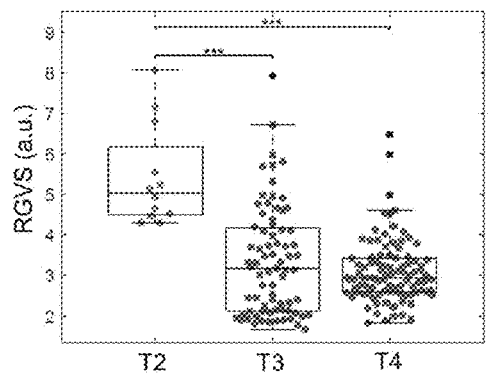
FIG. 6E shows boxplots of RGVS of gastric cancer samples according to Table 1 (no. 6-9, 21-22; n=6) at post-treatment cycle 1 against different T staging (T2, T3 and T4); * represents p≤0.001;  represents p≤0.01; * represents p≤0.05.
Figure 6F:
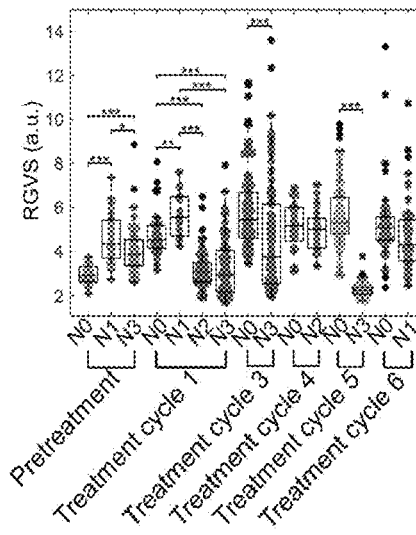
FIG. 6F shows boxplots of RGVS of positive clusters from 21 clinical samples at pre-treatment and different post-treatment cycles (1, 3, 4, 5, and 6) against different degrees of regional lymph nodes metastasis (N staging): pretreatment (n=3), treatment cycle 1 (n=9), treatment cycle 3 (n=3), treatment cycle 4 (n=2), treatment cycle 5 (n=2), and treatment cycle 6 (n=2); * represents p≤0.001;  represents p≤0.01; * represents p≤0.05.

For the samples obtained at advanced stages of treatment, the cluster size is progressively and significantly smaller ($p<0.001$) than the samples obtained before treatment (pretreatment), with significantly smaller clusters obtained from samples after prolonged treatment (e.g., after three cycles of treatment; FIG. 6J). The nGV fluctuates as the number of treatment cycles increases ($p<0.001$), reflecting the heterogeneity of cluster thickness on patient treatment responses (FIG. 6K). Since cancer is a dynamic and heterogeneous disease, tumor and tumor-associated cells exhibit distinct molecular signatures, leading to varied responses under treatment [12-14], which are reflected in the morphological differences observed among the clusters. On the other hand, RGVS is shown to positively correlate with the number of treatment cycles (FIG. 6A). There is no significant difference for the RGVS of clusters from samples of pretreatment and treatment cycle 1. However, as the treatment time increases, the RGVS of the samples from prolonged treatment increases significantly (after about three cycles of treatment; $p<0.001$), reflecting the decrease in cluster TA.

To further analyze the correlation between patient-derived cell clusters and treatment cycles with a specific cancer type, cluster size, nGV, and RGVS from the gastric (n=8) (Table 1: sample nos. 6-9 and 19-22) and breast cancer cohorts (n=10) (Table 1: sample nos. 10-14 and 27-31). The RGVS against different treatment cycle numbers, based on gastric cancer samples, are shown in FIG. 6B: pretreatment (3.35±1.21), treatment cycle 1 (2.61±0.42), and treatment cycle 3 (4.67±1.60). The cluster size of the samples from treatment cycle 6 is significantly smaller ($p<0.001$) than the primary treatment cycles (FIG. 6L). The RGVS in treatment cycle 6 is significantly higher ($p<0.001$) than the values obtained in treatment cycles 1 and 3, which verifies the significant positive correlation of RGVS with treatment cycles (FIG. 6B).

According to the RGVS obtained from the breast cancer samples against different treatment cycle numbers as shown in FIG. 6C: pretreatment (3.26±1.08), treatment cycle 1 (4.87±1.01), treatment cycle 3 (6.04±2.00), treatment cycle 5 (4.02±2.02), and treatment cycle 6 (5.23±1.68), a similar correlation to that from the gastric cancer samples is observed. For the breast cancer cohorts, the cluster size of samples from patients during all the treatment cycles is significantly smaller ($p<0.001$) than those obtained before treatment, and the nGV values of samples from treatment cycles 3 and 5 are significantly higher ($p<0.001$) than those of the samples from cycle 1 (FIG. 6M).

However, the correlation of RGVS with the treatment cycle number is more significant ($p<0.001$) in the breast cancer cohorts (FIG. 6C) than in the gastric cancer cohorts. Specifically, the RGVS of cluster images increases at all the treatment cycles for post-treatment samples compared to those pretreatment samples from the breast cancer cohorts, indicating looser clusters formed by the breast cancer-initiating cells due to the cancer treatment.

Correlation Between RGVS and Cancer Staging

Turning to FIGS. 6D-6I, to analyze the correlation between patient-derived cell clusters and TNM staging, the three parameters, i.e., cluster size, nGV, and RGVS, are measured from the clinical samples (Table 1: sample nos. 6-22 and 28-31), and analyzed their correlation with T staging, N staging, and cancer staging (0 to IV). A breast cancer sample with unknown TNM and cancer staging was not included in the analysis (Table 1: sample nos. 27).

T staging describes the size of the primary tumor. Boxplots of RGVS against different treatment cycles in FIG. 6D from 19 clinical samples (pretreatment (n=3), treatment cycle 1 (n=9), treatment cycle 3 (n=3), treatment cycle 4 (n=2), and treatment cycle 6 (n=2)) demonstrate that the RGVS decreases significantly in the treatment cycles 1 to 3 samples obtained from patients before treatment ($p<0.05$), and a similar trend is observed in the treatment cycles 2 to 4 for the patient cohort undergoing the treatment cycles 1 and 3, respectively ($p<0.001$), which indicate that RGVS negatively correlates with T staging. The clusters are thicker per area for patients with more advanced T staging than those under preliminary T staging (FIG. 6D).

The correlation of cluster parameters against T staging in specific patient cohorts (e.g., gastric cancer) is further studied. For patients with gastric cancer from the treatment cycles 2 to 4 under all treatment time points (Table 1: sample nos. 6-9, 19-22), the resultant RGVS significantly decreases ($p<0.001$) (FIG. 6N). Similar decreasing trends ($p<0.001$) are observed with clusters derived from gastric cancer samples under treatment cycle 1 (Table 1: sample nos. 6-9, 21-22; n=6) (FIG. 6E).

N staging describes the degree of regional lymph nodes metastasis. Boxplots of RGVS against different N staging in FIG. 6F from 21 clincal samples (pretreatment (n=3), treatment cycle 1 (n=9), treatment cycle 3 (n=3), treatment cycle 4 (n=2), treatment cycle 5 (n=2), and treatment cycle 6 (n=2)) demonstrate that the RGVS correlate significantly ($p<0.005$) with specific N staging (e.g., from N0 to N3 in treatment cycles 1, 3, and 5). Interestingly, for gastric cancer samples under all treatment cycles, RGVS is maintained at high values at preliminary N staging (N0 and N1) and decreases significantly to a low level in advanced N staging (N2 and N3) ($p<0.001$), which verifies an inverse correlation of RGVS to N staging, and clusters with advanced N staging tend to be thicker within each cluster area (FIG. 6O).

Figure 6G:
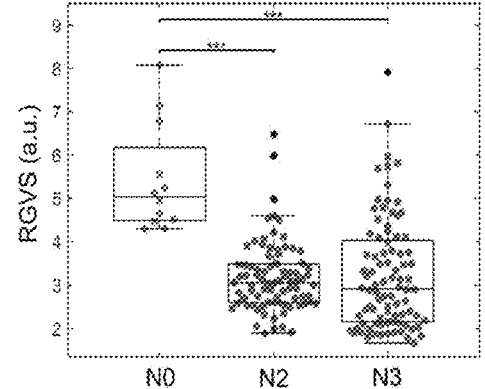
FIG. 6G shows boxplots of RGVS of gastric cancer samples according to Table 1 (no. 6-9, 21-22; n=6) at post-treatment cycle 1 against different N staging (N0, N2 and N3); * represents p≤0.001;  represents p≤0.01; * represents p≤0.05.

However, for gastric cancer samples obtained from patients under treatment cycle 1, RGVS only correlate significantly with specific N staging ($p<0.001$) (FIG. 6G).

Figure 6H:
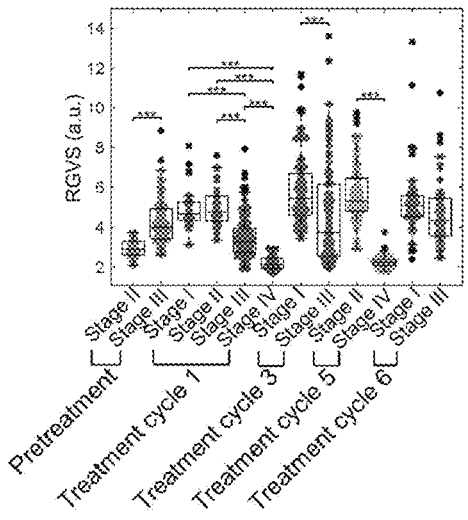
FIG. 6H shows boxplots of RGVS of positive clusters from 19 clincial samples against different overall cancer stages (stage I to stage IV): pretreatment (n=3), treatment cycle 1 (n=9), treatment cycle 3 (n=3), treatment cycle 5 (n=2), and treatment cycle 6 (n=2); * represents p≤0.001;  represents p≤0.01; * represents p≤0.05.

Furthermore, boxplots of RGVS against different overall cancer stages (stages I to IV) in FIG. 6H from 19 clincial samples (pretreatment (n=3), treatment cycle 1 (n=9), treatment cycle 3 (n=3), treatment cycle 5 (n=2), and treatment cycle 6 (n=2)) demonstrate that RGVS of clusters decreases significantly at more advanced overall cancer staging, specifically from stage III to IV in treatment cycle 1, stage I to III in treatment cycle 3, and stage II to IV in treatment cycle 5 ($p<0.001$).

Figure 6I:
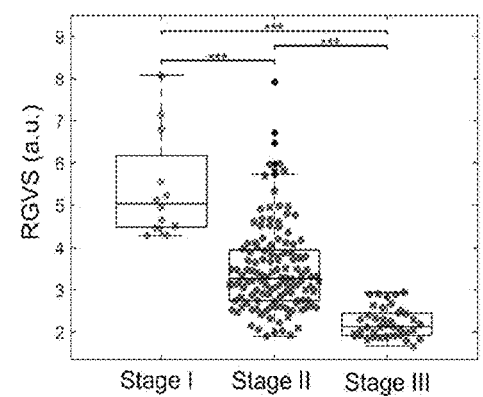
FIG. 6I shows boxplots of RGVS of gastric cancer samples according to Table 1 (no. 6-9, 21-22; n=6) at post-treatment cycle 1 against different against different overall cancer stages (stage I to stage III); * represents p≤0.001; represents p≤0.01;* represents p≤0.05.
Figure 6J:
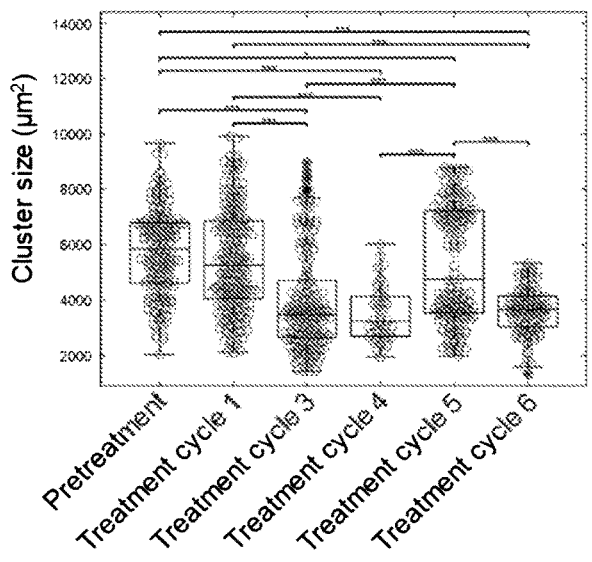
FIG. 6J shows a correlation between patient-derived cell clusters (n=22) and treatment cycles (pre-treatment (n=4), treatment cycle 1 (n=9), treatment cycle 3 (n=3), treatment cycle 4 (n=2), treatment cycle 5 (n=2) and treatment cycle 6 (n=2)), respectively; * represents p≤0.001;  represents p≤0.01; * represents p≤0.05.
Figure 6K:
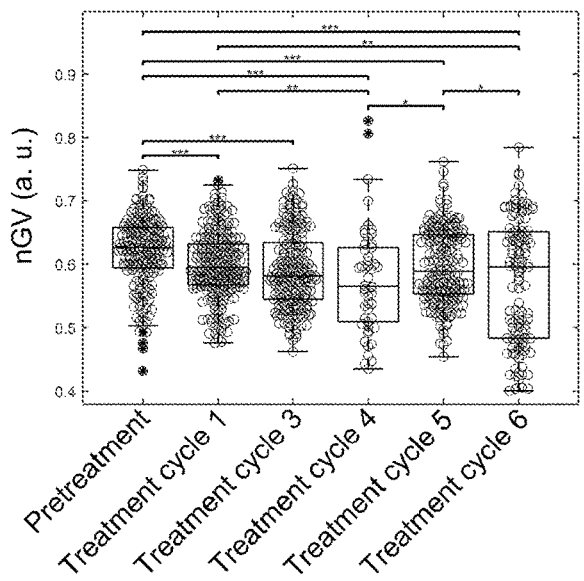
FIG. 6K shows boxplots of cluster size and nGV of patient clusters (n=22) against treatment cycles (pre-treatment (n=4), treatment cycle 1 (n=9), treatment cycle 3 (n=3), treatment cycle 4 (n=2), treatment cycle 5 (n=2) and treatment cycle 6 (n=2)), respectively; * represents p≤0.001;  represents p≤0.01; * represents p≤0.05.
Figure 6L:
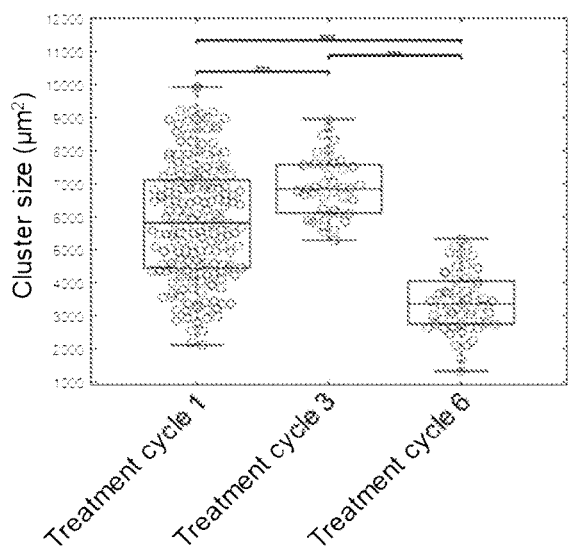
FIG. 6L shows a correlation between patient-derived cell clusters (n=8) and gastric cancer treatment cycles; (treatment cycle 1 (n=6), treatment cycle 3 (n=1) and treatment cycle 6 (n=1)), respectively; * represents p≤0.001;  represents p≤0.01; * represents p≤0.05; n.s. represents p>0.05.
Figure 6M:
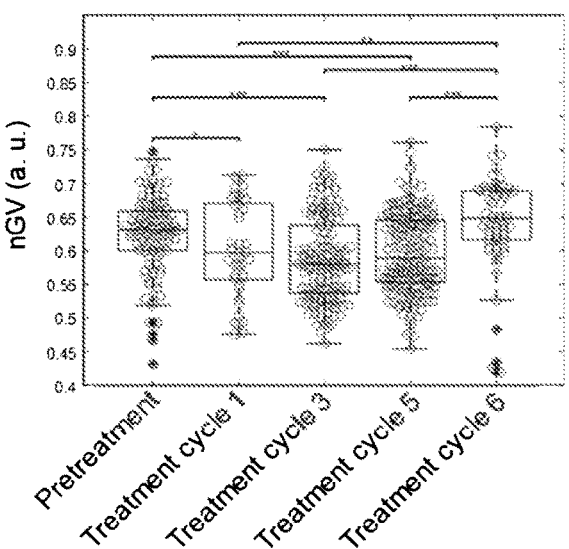
FIG. 6M shows boxplots of nGV of patient clusters from breast cancer patients (n=10) against treatment cycles (pre-treatment (n=2), treatment cycle 1 (n=3), treatment cycle 3 (n=2), treatment cycle 5 (n=2) and treatment cycle 6 (n=1)), respectively; * represents p≤0.001;  represents p≤0.01; * represents p≤0.05.
Figure 6N:
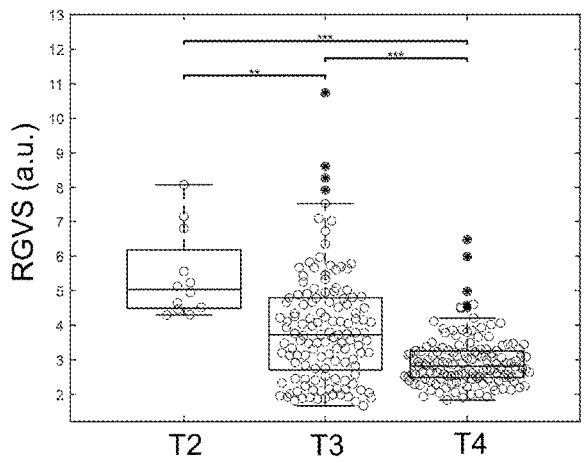
FIG. 6N shows boxplots of RGVS of patient clusters from gastric cancer patients (n=8) against T staging, respectively; * represents p≤0.001;  represents p≤0.01; * represents p≤0.05; n.s. represents p>0.05.
Figure 6O:
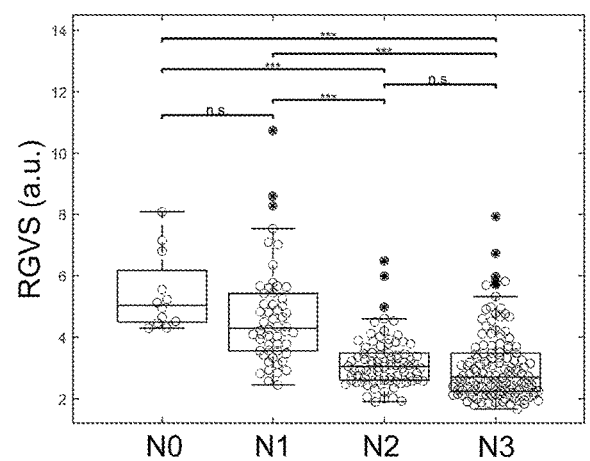
FIG. 6O shows boxplots of RGVS of patient clusters from gastric cancer patients (n=8) against N staging, respectively; * represents p≤0.001;  represents p≤0.01; * represents p≤0.05; n.s. represents p>0.05.
Figure 6P:
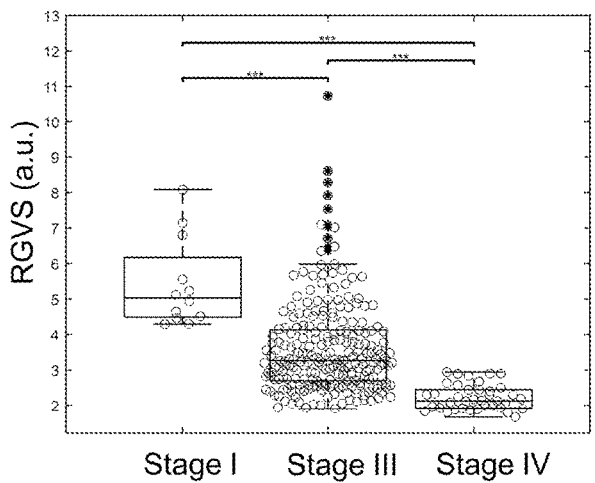
FIG. 6P shows boxplots of RGVS of patient clusters from gastric cancer patients (n=8) against overall cancer staging, respectively; *** represents p≤0.001* represents p≤0.05.

A similar significant decreasing trend for RGVS is observed in all the gastric cancer samples (p<0.001) (FIG. 6P) and gastric samples under treatment cycle 1 (p<0.001) (from boxplots of RGVS against different cancer stages (stages I and III) from gastric cancer patients (n=6) in treatment cycle 1, respectively, as shown in FIG. 6I).

In short, the results from FIGS. 6D-6I verify that RGVS correlate inversely with different cancer stages, including T staging, N staging, and overall cancer staging, and the capability and potential of RGVS to distinguish cancer patients in different cancer stages significantly. It is useful to medical practitioners in evaluation of efficacies of a specific cancer treatment during the treatment regime.

Training of Deep Learning Neural Network and Establishing Prediction Model

Turning to FIGS. 7A to 7E, an overview of training a deep learning neural network by different datasets and preparation of the prediction model based on the trained neural network is provided. In FIG. 7A, it illustrates what datasets should be prepared prior to training each segment of the neural network (step d) in order for the neural network to process a test sample image and output a prediction result afterwards.

In certain embodiments, the neural network of the present invention can be divided into two main sections: segmentation and classification sections. The procedures for training each of these main sections include preparing a classification dataset (step b) and a segmentation dataset (step c) based on cluster images captured from the tumor model and processed by the LIQBP. Examples of the prepared classification dataset and the prepared segmentation dataset are shown in FIGS. 7B and 7C, respectively.

In FIG. 7B, cluster images of clinical samples from different cohorts, healthy donors and cancer patients according to Table 1, are used in this example for illustration purpose. Initially, microwells (region of interest, ROI) in the images are identified and cut by Unet and python (s701) to obtain a number of resized images (203 resized images are obtained in this example) each containing a single microwell. Each of the resized images is then annotated by a well-trained person who can differentiate whether the microwell from each of the images contains positive or negative cell clusters (s702). After annotation, the annotated images will be divided into training, validation and test datasets (s703). A preferred ratio between training dataset, validation dataset, and test dataset is 6:2:2. The training dataset in this example contains 123 annotated images including 25 positive images and 98 negative images; the validation dataset contains 40 annotated images including 15 positive and 25 negative images; the test dataset contains 40 images including 20 positive and 20 negative images. The training dataset will be fed into the classification section of the neural network for training. In a preferred embodiment, Resnet 34 is used as the deep learning model for the classification section of the neural network. Other models such as Resnet and VGG16 could also be used for classification training. Before training, the image data may be augmented by a data augmentation module using different augmentation techniques such as horizontal flip, vertical flip, random rotation, random center crop, warp, and HSV change (s722, FIG. 7D). After the augmentation, the images will be resized into 512×512 pixels before feeding into the model. After the program inputs the image, the program normalizes the RGB channels of the image base on the Gaussian distribution. The normalization parameters in Gaussian distribution are set as follows: mean=[0.485, 0.456, 0.406], standard deviation: std=[0.229, 0.224, 0.225].

Figure 9A:
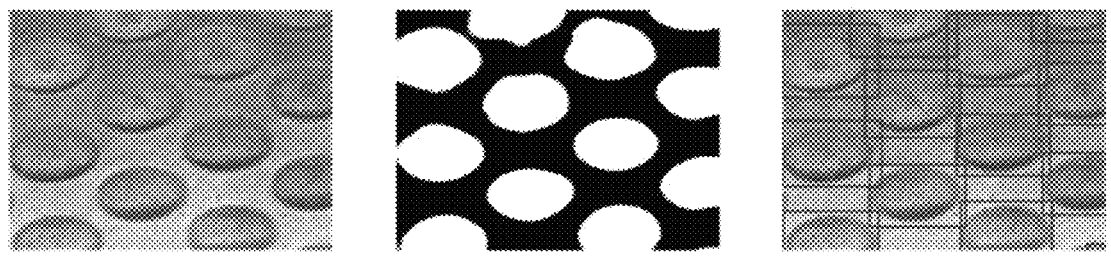
FIG. 9A shows a prediction result by the neural network based on ResUnet++ with a 100× magnification microscopy image: from the left: (1) original picture; (2) the predict result of ResUnet++; (3) using rectangle to mark position and size of each microwell.
Figure 9B:
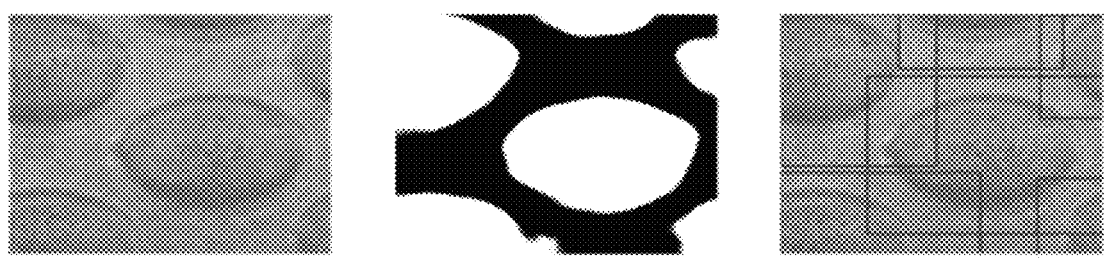
FIG. 9B shows a prediction result by the neural network based on ResUnet++ with a 200× magnification microscopy image: from the left: (1) original picture; (2) the predict result of ResUnet++; (3) using rectangle to mark position and size of each microwell.

In FIG. 7C, two sets of segmentation datasets are prepared for training two separate models in the segmentation section. A first segmentation dataset is prepared from 100× magnification images after annotations by the well-trained person similar to the annotation during the preparation of the classification dataset (s711), while a second segmentation dataset is prepared from 200× magnification images after said annotations (s712). In each of the segmentation datasets, it is further divided into training and test datasets. About 70% of the data will be used for training while the remaining will be used for testing. In a preferred embodiment, the ResUnet++ is selected as a model for segmentation section of the neural network. Other models such as Unet or ResUnet may be used in classification section of the neural network. Data augmentation is performed (s721, FIG. 7D) by applying similar augmentation techniques used during preparation of the classification dataset to each of the segmentation datasets before feeding into the model for training. Two prediction results generated from two different training datasets (images in two different magnifications) are shown in FIGS. 9A and 9B, respectively. In FIGS. 9A and 9B, the image on the left side is the original image; the middle picture is the result after feeding the image into ResUNet++; the picture on the right side is the prediction output which use rectangle to mark position and size of each microwell.

After training, the segmentation and classification sections, i.e., ResUNet++ and Resnet 34 networks are connected, such that the neural network can be used to mark each microwell and analyze the CTC clusters in each microwell whether they are positive or negative, in order to phenotype the test sample (healthy or disease) and predict the cancer stage of the diseased sample. In certain embodiments, SGD optimizer is selected for optimizer of Resnet 34 network; the loss function uses Cross Entropy Loss. (lr=0.001, momentum=0.9, epochs=25, batch_size=4, pic_height=224, pic_width=224). In these embodiments, the connection method includes the following sequence of steps: after using ResUnet++, using the threshold function and findContours function of OpenCV to find the position of each microwell, followed by cutting and importing the image marked with the position of microwell into Resnet 34 to analyze the negative and positive of each microwell (FIG. 7E).

Figure 8A:
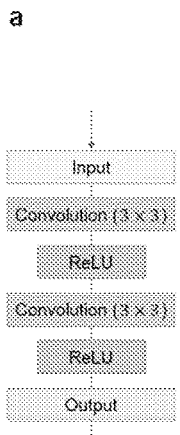
FIG. 8A shows a block diagram of the structure of a neural network based on Unet.
Figure 8B:
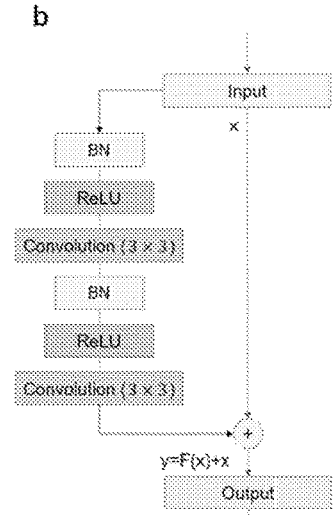
FIG. 8B shows a block diagram of a neural network based on ResUnet for identity mapping.

Validation of Selected Deep Learning Models for Different Sections of Neural Network FIGS. 8A and 8B depicts the architecture of Unet and ResUnet, respectively, in terms of a block diagram. The main difference between the two is that ResUnet has inserted Batch Normalization (BN) before each convolution layer and an identity mapping to add the input (x) of a block to its output.

Figure 8C:
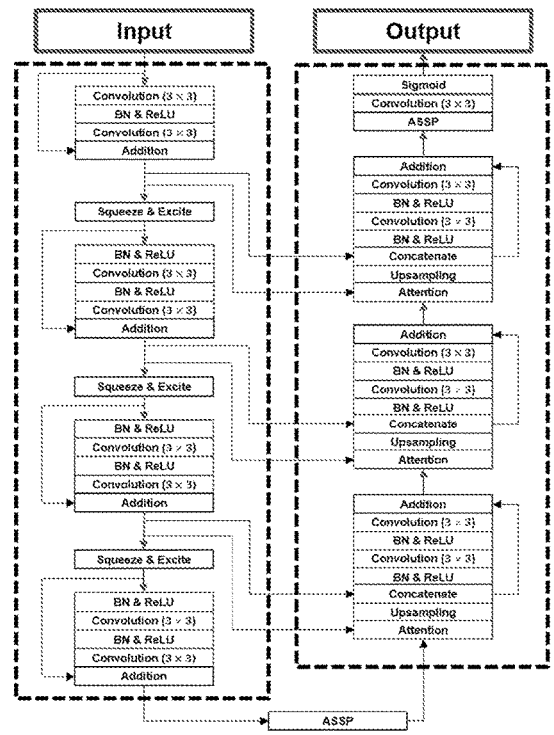
FIG. 8C shows a block diagram of a neural network based on ResUnet++ used for segmentation in the present invention.

In FIG. 8C, the architecture of ResUnet++ is provided also as a block diagram. Compared to Unet and ResNet, the ResUnet++ is added with more BN and Residual Units (BN & ReLU) before each convolution layer, Squeeze and Excitation Units among convolution layers, Atrous Spatial Pyramidal Pooling (ASSP) between input and output modules, and Attention Units (Attention) before each upsampling unit in each of the layers at the output module. The loss function selected by this model is a combination of binary cross-entropy and dice loss function. In certain embodiments, when the data augmentation module is used, a neural network optimizer, Adam (A Method for Stochastic Optimization), will be used. The loss function uses BCEDiceLoss (Binary Cross-Entropy and Dice loss). (lr=0.00001, epochs=1000, batch_size=4, pic_height=512, pic_width=512).

Figure 8D:
FIG. 8D shows a workflow of prediction by the neural network based on ResUnet++ according to certain embodiments of the present invention.

Before feeding the dataset to the ResUnet++, like the training procedure, data augmentation is preferably performed before segmentation. After data augmentation, images will be resized into 512×512 pixels before being subject to different convolution layers of the ResUnet++ for outputting the prediction result (FIG. 8D). The prediction results by two different ResUnet++ generated from two different datasets (images in two different magnifications) would be similar to those shown in FIGS. 9A and 9B.

Table 2 below summarizes the accuracy of the output of the ResUnet++ from the testing datasets in terms of pixel accuracy (PA), mean pixel accuracy (mPA) and mean Intersection over Union (mIoU):

TABLE 2

|  | 100 × Microscope magnification | 200 × Microscope magnification |
|---|---|---|
| PA | 0.7487612 | 0.767937 |
| mPA | 0.7512751 | 0.773756 |
| mIoU | 0.6076545 | 0.6317378 |

Figure 10:
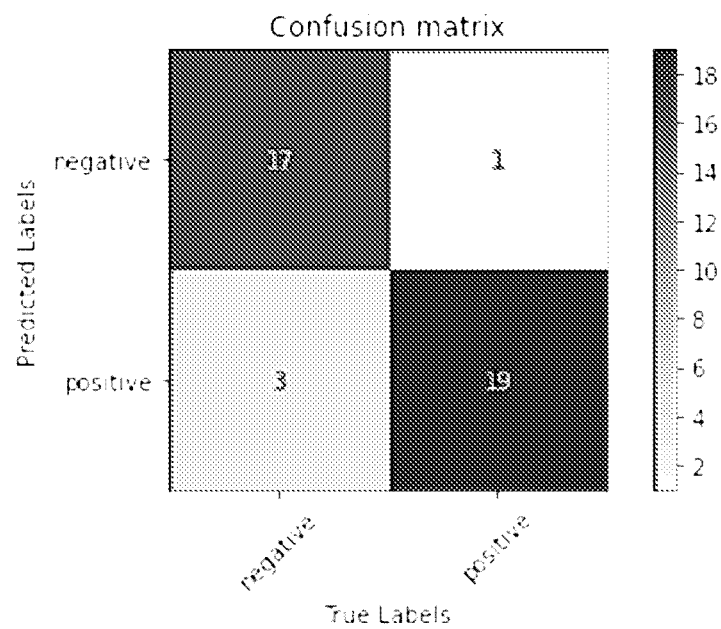
FIG. 10 schematically depicts a confusion matrix of an output by the neural network based on Resnet 34 for classification according to certain embodiments of the present invention.
Figure 11:
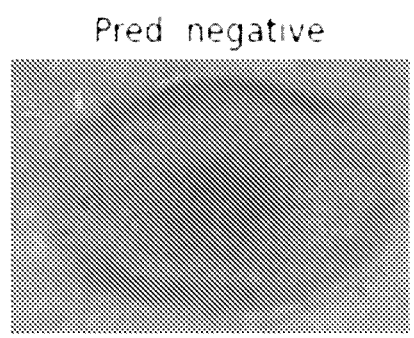
FIG. 11 shows an image of negative microwell predicted by the Resnet.
Figure 12:
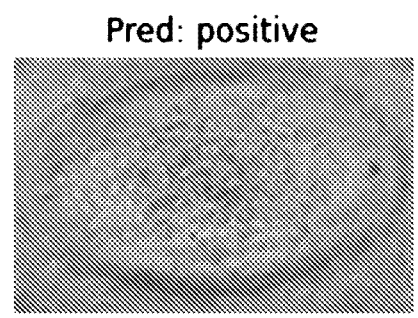
FIG. 12 shows an image of positive microwell predicted by the Resnet.

The output of the segmentation section (markings of microwell position and size on images) is fed into Resnet 34 for subsequent classification. The output of the classification are shown in FIGS. 11 and 12 (FIG. 10 shows a corresponding confusion matrix). In FIG. 10, true positive (TP) stands for the result that correctly indicates the presence of the image; true negative (TN) stands for the result that correctly indicates the absence of the image; false positive (FP) stands for the result which wrongly indicates that the image; false negative (FN) stands for the result which wrongly indicates that the image. The value of precision, recall and specificity can be calculated as follows:

Precision=$TP/(TP+FP)$;

Recall=$TP/(TP+FN)$;

Specificity=$TN/N$

Table 3 below summarizes the prediction result of Resnet 34 as a classifier in terms of precision, recall and specificity of the predicted cluster phenotype:

TABLE 3

|  | Precision | Recall | Specificity |
|---|---|---|---|
| Negative | 0.944 | 0.85 | 0.95 |
| Positive | 0.864 | 0.95 | 0.85 |

Figure 13A:
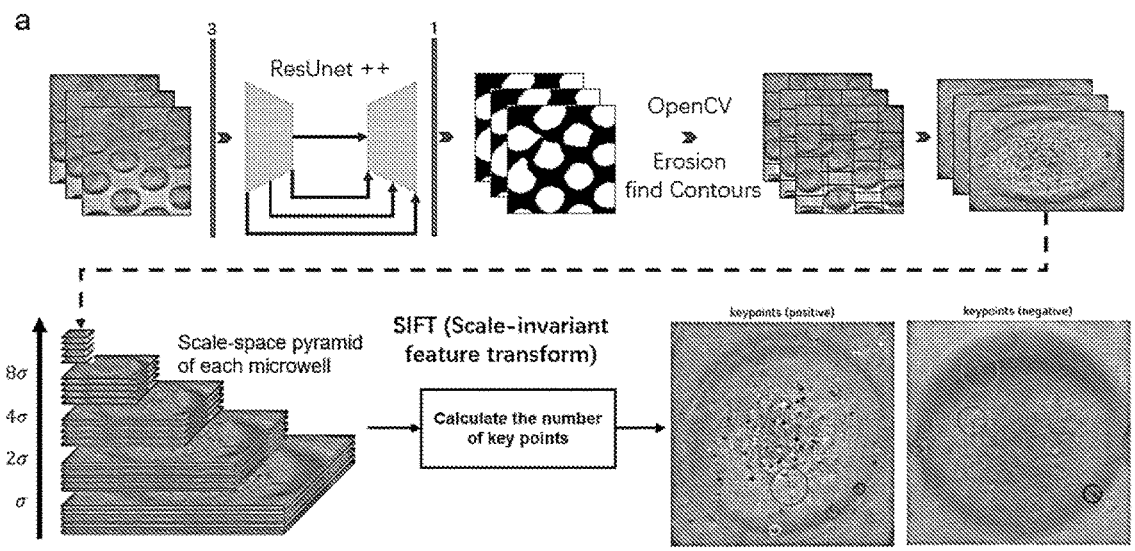
FIG. 13A shows the use of scale-invariant feature transform (SIFT) for classification to calculate key points in each microwell after the segmentation by the ResUnet++ according to certain embodiments of the present invention.
Figure 13B:
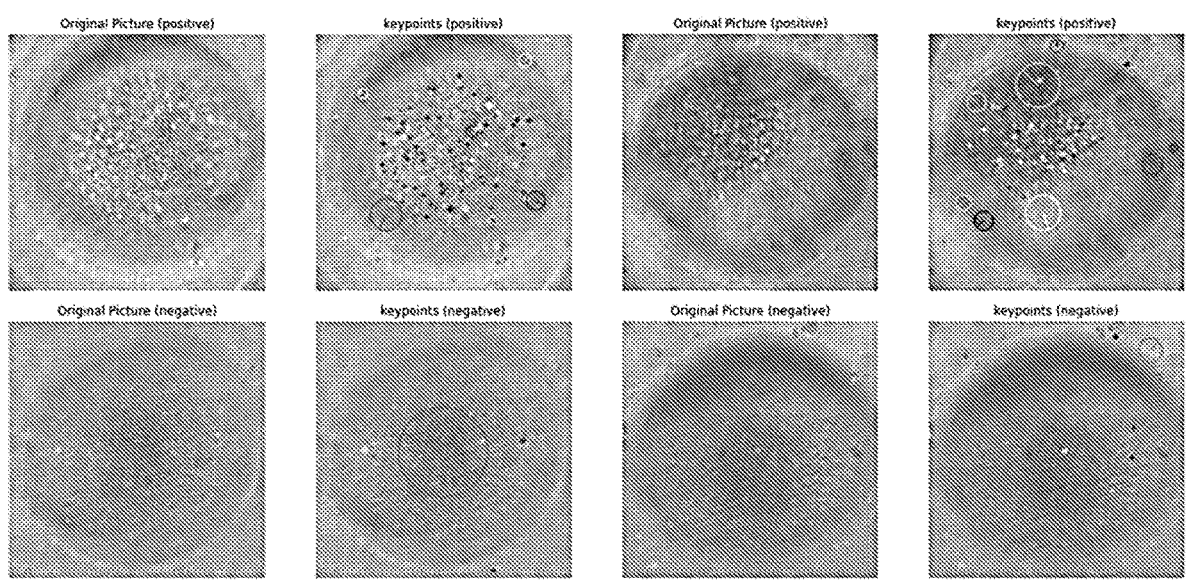
FIG. 13B shows the classification result by the SIFT in terms of the positive and negative microwell images after segmentation by the ResUnet++ according to certain embodiments of the present invention.
Figure 13C:
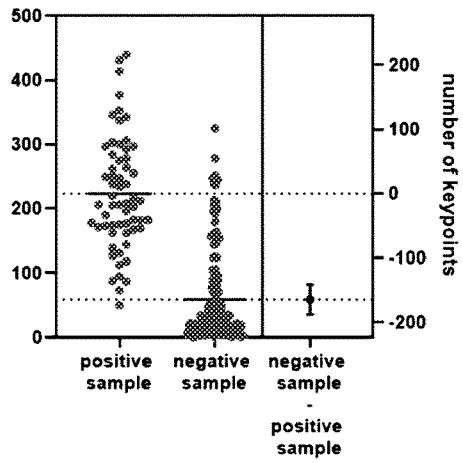
FIG. 13C shows plots of the distribution of the number of key points in each microwell as shown in FIG. 13B.
Figure 13D:
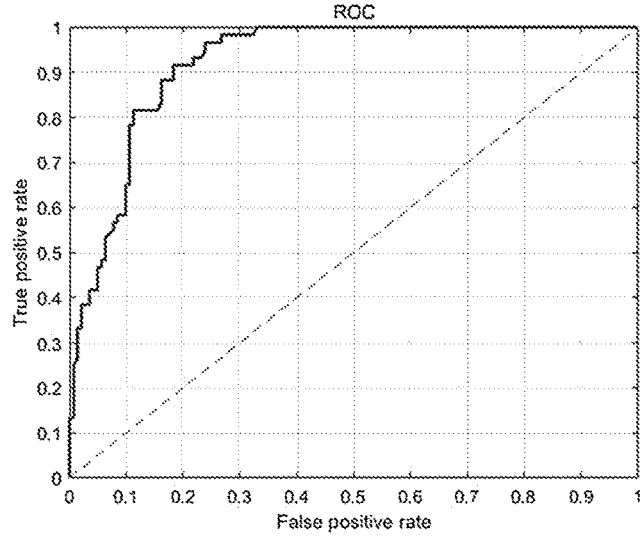
FIG. 13D shows a receiver operating characteristic (ROC) curve of the prediction by the SIFT method according to certain embodiments of the present invention.
Figure 13E:
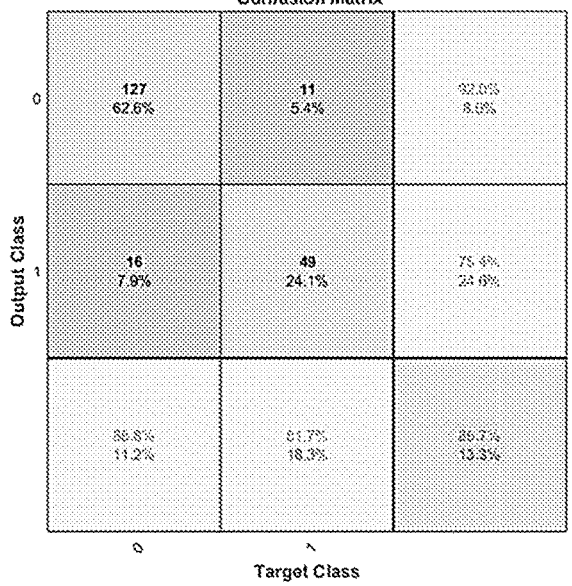
FIG. 13E schematically depicts a confusion matrix of an output by the SIFT method according to certain embodiments of the present invention.
Figure 14A:
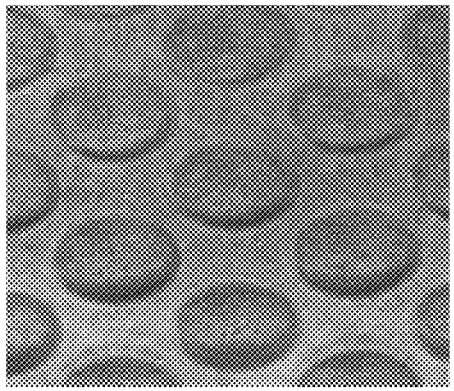
FIG. 14A shows an original 100× microscopy image of microwells for segmentation by a neural network based on four different deep learning models: Unet, Unet++, ResUnet, and ResUnet++.
Figure 14D:
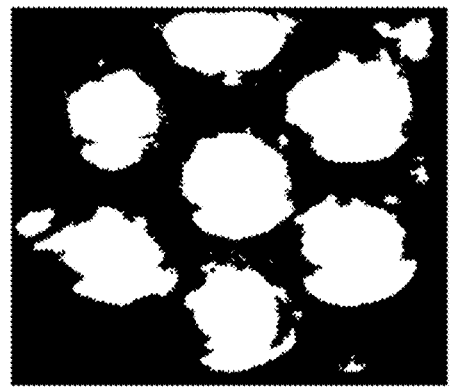
FIG. 14D shows an image of microwells after segmentation of the ground trust image as shown in FIG. 14B by the neural network based on Unet++.
Figure 14B:
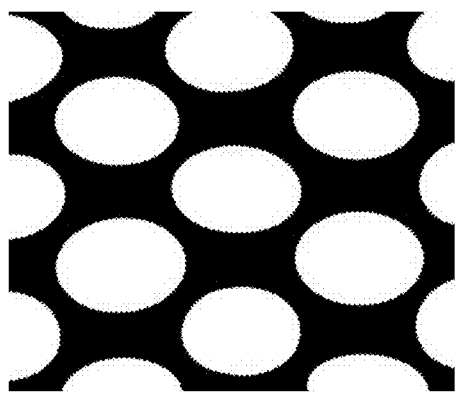
FIG. 14B shows a ground truth image of microwells converted from the original image as shown in FIG. 14A.
Figure 14E:
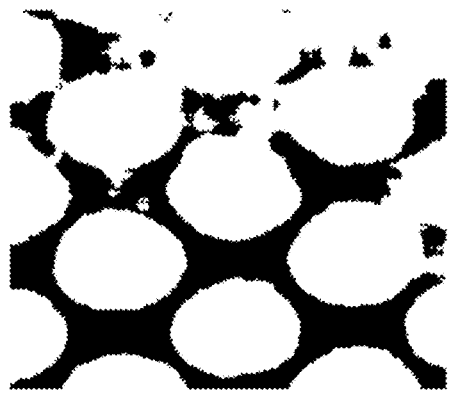
FIG. 14E shows an image of microwells after segmentation of the ground trust image as shown in FIG. 14B by the neural network based on ResUnet.
Figure 14C:
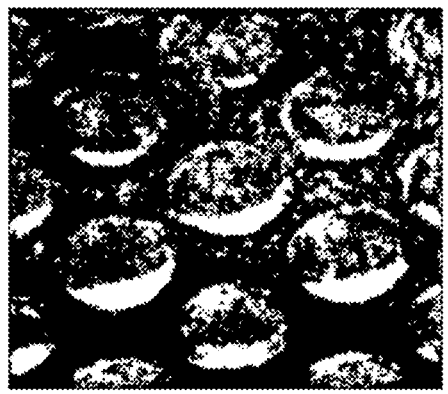
FIG. 14C shows an image of microwells after segmentation of the ground trust image as shown in FIG. 14B by the neural network based on Unet.
Figure 14F:
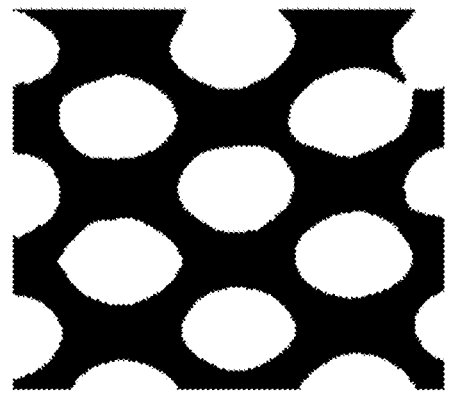
FIG. 14F shows an image of microwells after segmentation of the ground trust image as shown in FIG. 14B by the neural network based on ResUnet++.
Figure 15A:
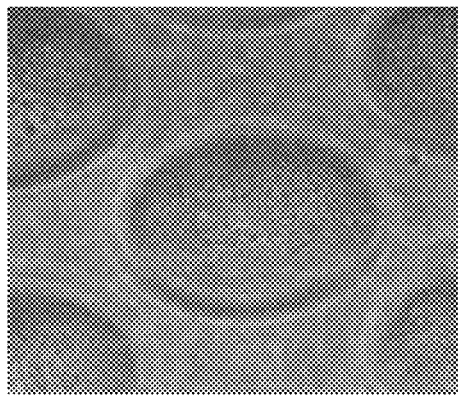
FIG. 15A shows an original 200× microscopy image of a microwell for segmentation by a neural network based on four different deep learning models: Unet, Unet++, ResUnet, and ResUnet++
Figure 15D:
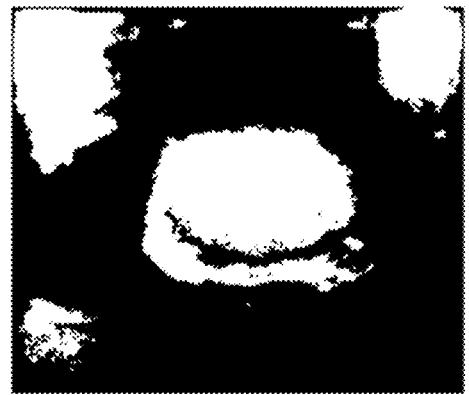
FIG. 15D shows an image of the microwell after segmentation of the ground truth image as shown in FIG. 15B by the neural network based on Unet++.
Figure 15B:
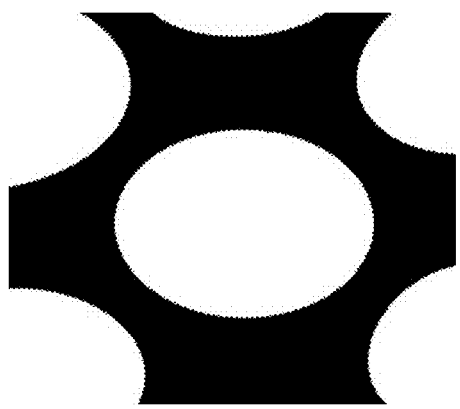
FIG. 15B shows a ground truth image of the microwell converted from the original image as shown in FIG. 15A.
Figure 15E:
FIG. 15E shows an image of the microwell after segmentation of the ground truth image as shown in FIG. 15B by the neural network based on ResUnet.
Figure 15C:
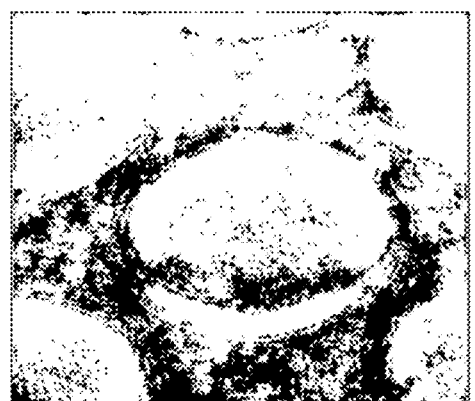
FIG. 15C shows an image of the microwell after segmentation of the ground truth image as shown in FIG. 15B by the neural network based on Unet.
Figure 15F:
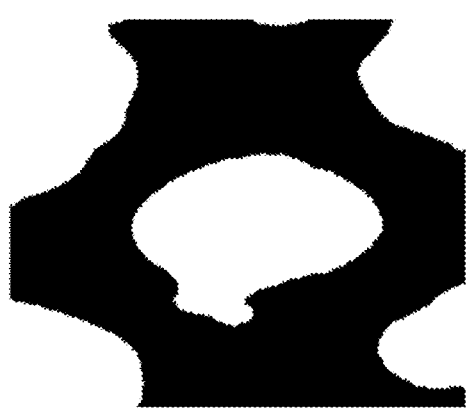
FIG. 15F shows an image of the microwell after segmentation of the ground truth image as shown in FIG. 15B by the neural network based on ResUnet++.

Turning to FIGS. 13A to 13E, besides using Resnet 34 as a classifier after the segmentation section, it is found that using SIFT to calculate the number of key points in microwell also results in a good classification between positive and negative cluster samples. The number of key points in the positive microwells is significantly more than that in the negative microwells, and the key points are often distributed on the cells. The reason for this is that each cell has a higher reflection of light and is more easily identified as a key point by the Scale-space pyramid (FIG. 13A). After setting an appropriate threshold as 160, the accuracy rate can reach 86.7%. FIG. 13C shows an estimated plot of positive and negative key points calculated by SIFT. The mean of negative key points minus the mean of positive key points is −164.2±11.77.

Comparison Between Different Deep Learning Models for Segmentation

Except for ResUNet++, the present disclosure also compares four different neural network models. Here, the tested models are: Unet, ResUnet, Unet++ and ResUnet++. Tables 4 and 5 below summarize the accuracy of the output by different models in this test:

TABLE 4

| Segmentation result using 100 × magnification images: | | | | |
|---|---|---|---|---|
| 100 × Microscope | Unet | Unet++ | ResUnet | ResUnet++ |
| PA | 0.5182035 | 0.6853312 | 0.7309922 | 0.767937 |
| mPA | 0.5329766 | 0.6831566 | 0.7287707 | 0.773756 |
| mIoU | 0.2939853 | 0.5039996 | 0.5718004 | 0.6317378 |

TABLE 5

| Segmentation result using 200 × magnification images: | | | | |
|---|---|---|---|---|
| 200 × Microscope | Unet | Unet++ | ResUnet | ResUnet++ |
| PA | 0.5345968 | 0.6612353 | 0.6815394 | 0.7487612 |
| mPA | 0.5281845 | 0.6619701 | 0.6886768 | 0.7512751 |
| mIoU | 0.3409356 | 0.4816168 | 0.4997971 | 0.6076545 |

FIGS. 14C to 14F and FIGS. 15C to 15F show the segmentation result of marking location and size of microwell by different tested models (Unet, ResUnet, Unet++ and ResUnet++) from two different segmentation datasets (images in two different magnifications), and FIGS. 14A, 14B, 15A, and 15B show the original and ground truth images from two different datasets, respectively.

From the comparative result, ResUnet++ outperforms the other three deep learning models, and therefore it is selected as a preferred model for segmentation in certain embodiments of the present invention.

Comparison Between Resnet 34 and VGG16 for Classification

Except Resnet 34, the present disclosure also compares its classification performance with VGG16 in terms of the precision, recall and specificity of their predicted results (positive or negative clusters in the identified microwell). Results are shown in Table 6:

TABLE 6

|  | Precision | Recall | Specificity |
|---|---|---|---|
|  | Resnet34 | | |
| Negative | 0.944 | 0.85 | 0.95 |
| Positive | 0.864 | 0.95 | 0.85 |
|  | VGG16 | | |
| Negative | 0.792 | 0.95 | 0.75 |
| Positive | 0.938 | 0.75 | 0.95 |

Figure 16:
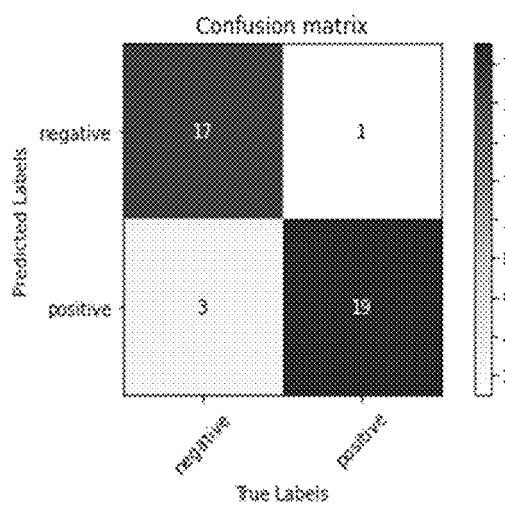
FIG. 16 schematically depicts a confusion matrix of Resnet 34 for classification according to certain embodiments of the present invention.
Figure 17:
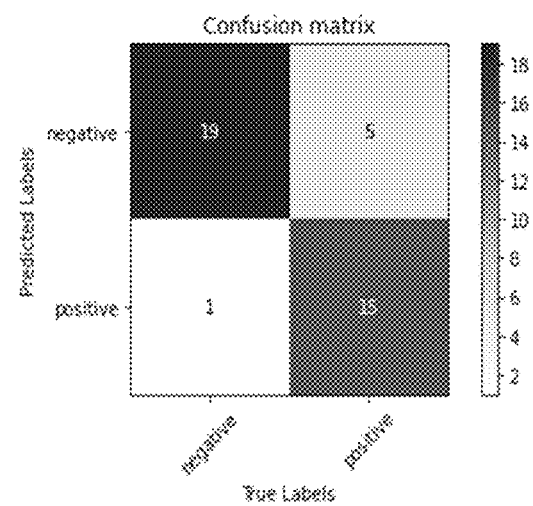
FIG. 17 schematically depicts a confusion matrix of VGG16 for classification according to the method described in the present invention.

FIGS. 16 and 17 provide confusion matrices of Resnet 34 and VGG16, respectively.

From the comparative results as shown in this example, it is observed that Resnet 34 model is more accurate (~90% accuracy) than VGG16 (~85% accuracy). Therefore, Resnet 34 is selected as a preferred model for classification in certain embodiments of the present invention.

Figure 18:
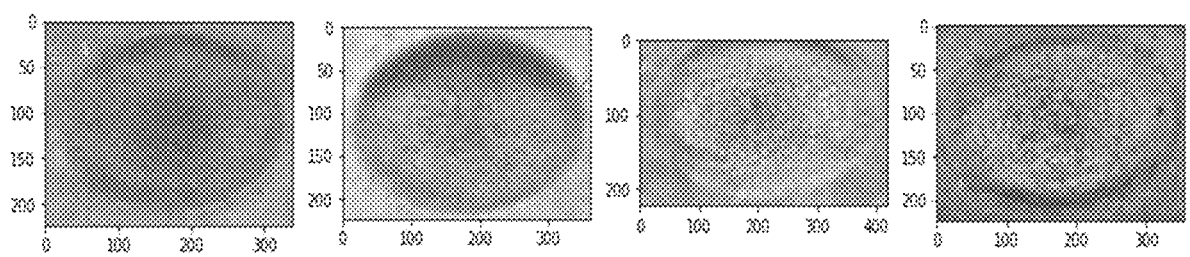
FIG. 18 shows four original images of microwell acquired by the image acquisition module of the present invention.
Figure 19:
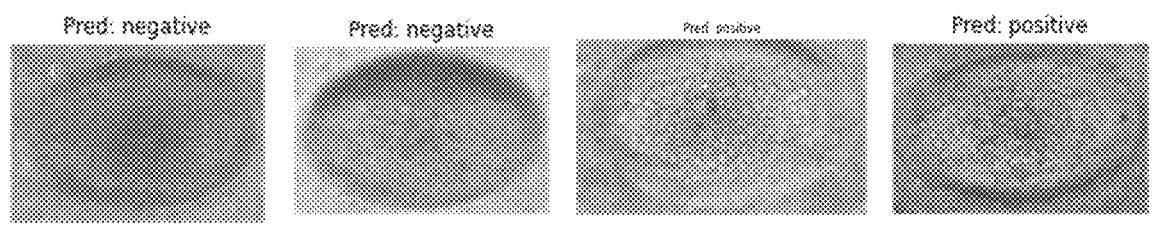
FIG. 19 shows a corresponding prediction result of the four original images as shown in FIG. 18 by Resnet 34 as classifier according to certain embodiments of the present invention.
Figure 20:
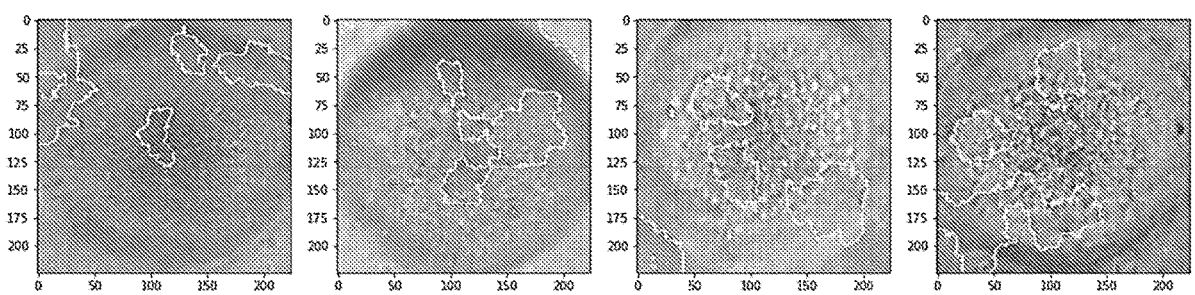
FIG. 20 shows masking on the images as shown in FIG. 19 by using local interpretable model-agnostic explanations (LIME) protocol to encourage top prediction, where the masked areas are highlighted by light gray lines.
Figure 21:
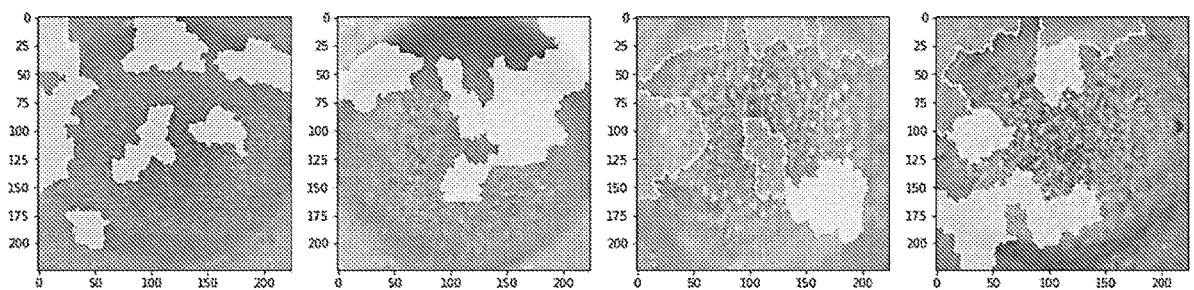
FIG. 21 shows the areas which contribute to the top prediction encouraged by the LIME protocol.

Local interpretable model-agnostic explanations (LIME) protocol is used in this example to mask on image and see the areas encouraging the top prediction. In this demonstration, four images, as shown in FIG. 18, are randomly selected from classification dataset for testing, and the four parallel images shown in FIG. 19 are prediction result of the four images in FIG. 18 by the Resnet 34 according to certain embodiments of the present invention, where from the left side of FIG. 19, the results are negative, negative, positive and positive clusters. By using a mask on those images, areas that encourage the top prediction as those light gray lines shown in FIG. 20 can be visualized, while the areas that contribute against that top prediction are turned on which can be seen by light gray shadings as in FIG. 21.

Comparison Between LIQBP Tumor Model and Conventional Methods

Compared with other conventional models (Table 7), the label-free and high-throughput algorithm analysis of patient-derived CTC clusters with LIQBP paves the way for personalized medicine. Clinical cohorts could be distinctly stratified with high sensitivity and specificity. It is demonstrated that the $nSD^{GV}$, reflecting cluster roughness, is the most effective index to stratify the healthy and pretreatment patient cohorts. The percentage of positive clusters and samples in each sample and cohort, respectively, are determined based on the threshold. The results demonstrate that the percentage of the positive samples correlate inversely with the treatment cycles, suggesting that fewer positive samples are determined in the cohort as the treatment cycle number increases.

EXAMPLES

This section will provide detailed procedures and materials in enabling certain embodiments and examples described in the present disclosure, but it should not be considered to limit the scope of the invention:

(A) Fabrication of the Microfluidic-Based Tumor Model

An integrated, microfluidic-based tumor model includes a microfluidic-based biochip composed of two polydimethylsiloxane (PDMS) layers assembled with plasma treatment. The master mold with ellipsoidal microwells was fabricated according to the diffuser back-side lithography procedure. The mold contains eight arrays, and each array contains 300 ellipsoidal microwells. The length, width, and depth of each ellipsoidal microwell are 250 µm, 150 µm, and 150 µm, respectively. PDMS (Sylgard 184 Silicone Elastomer Kit, Dow Corning, USA) was prepared with the ratio of 10:1 (elastomer versus curing agent). The PDMS was poured for casting patterns from the mold and then put into an oven for baking for 2.5 hours at 70° C. After that, the PDMS with ellipsoidal microwells pattern was peeled off. The master mold of the barrier layer was fabricated using 3D printing. The PDMS was poured into the PLA mold and baked for 2.5 hours at 70° C. Then, the PDMS was peeled off. The microwell layer and barrier layer were assembled with plasma treatment for 5 min with 700 mmtor. Finally, the assembled microfluidic chip was put into an oven to bake for 2 hours at 70° C.

TABLE 7

| Features | This tool | Bright field-based | Fluorescence-based | SEM-based | TEM-based |
| --- | --- | --- | --- | --- | --- |
| Label-free | Yes | Yes | No | Yes | Yes |
| Phenotype analysis | High | Medium | Medium | High | Medium |
| User interface | Yes | No | No | No | No |
| Quantitative analysis | Yes | Yes | Yes | Yes | No |
| Ease of setup | High | Medium | Low | Low | Low |
| Ease of use | High | Medium | Low | Low | Low |
| Robustness | Yes | Yes | Yes | Yes | Yes |
| High-throughput | High | High | Medium | Medium | Medium |
| Sample type | Clinical samples (n = 20) | Cancer cell line | Cancer cell line | Cancer cell line | Cancer cell line |
| Applications | Distinguishing healthy donors and cancer patients, and correlation analysis with treatment duration and cancer staging | Drug screening/ Prediction of spheroid formation | Quantify nanotherapeutic penetration/ Screen chemotherapeutic drug cytotoxic activity | Cytotoxicity effect of drug | Study interaction of nanoparticles with spheroids |

SEM = scanning electron microscopy, TEM = transmission electron microscopy

Furthermore, the present invention provides automatic detection and classification suggestion. In certain embodiments, the data augmentation method only needs a few pictures and annotations for the neural network to complete the automatic detection algorithm, which significantly shortens the analytical time and increases the sampling capacity.

(B) Clinical Samples Preparation

Blood samples were collected from a total of 31 patients (Table 1). The institutional review board approved this study under ethical approval (certificate no. XHEC-NSFC-2020-078). All patients consented to be included in the study.

Blood samples were collected at different treatment timing points from each patient. They were collected in EDTA-coated vacutainer tubes (Becton-Dickinson) and mixed with red blood cell lysis buffer (Life Technologies) under three to five min at room temperature and then centrifuged at 1000 g for five min to remove the supernatant. The lysis reaction was washed with sterile phosphate-buffered saline (PBS) three times.

(C) Cell Seeding

Cell suspension from each tested clinical sample obtained from Part (B) was distributed evenly into the microchannel of the microfluidic biochip. The samples were suspended with Dulbecco's Modified Eagle Medium (DMEM) (10% Fetal Bovine Serum (FBS), 1% penicillin-streptomycin) into 1.6 mL and mixed gently. 200 μL of the diluted samples were added to each channel.

(D) Maintenance of Cell Culture

After cell seeding, the integrated chip was placed in a 150 mm dish and incubated under humidified conditions with 5% $CO_2$ and 1% $O_2$ at 37° C. for 14 days. The media was refreshed every three days.

(E) Cell Viability Test

A cocktail containing Calcein-AM (Invitrogen, #C3100MP, USA) and SYTOX Red (Invitrogen, #S34859, USA) was incubated for 30 min at 37° C. to evaluate the viability of cells in the microchannel. The assay was washed gently by PBS and imaged by a confocal laser scanning microscope (Leica TCS SP8 MP, Germany).

(F) Label-Free Monitoring of Tumor Models

A phase-contrast microscope (Nikon, Eclipse Ci-L, Japan) was used to monitor the cultured results in the integrated chip on the $1^{st}$, $3^{rd}$, $7^{th}$ and $14^{th}$ days of culture. The exposure time, ISO sensitivity, and white balance of the CCD camera on the microscope were fixed to ensure the same illumination conditions in each experiment.

(G) Image Processing

The customized LIQBP software contained an interface and a label-free image algorithm designed with the MATLAB App Designer. The detected cluster and the quantitative parameters of the clusters' phenotypes would display automatically on the software. During image processing, background correction was performed to pre-process the tested image. After that, the microwell region was detected, cropped, and saved automatically for further cluster identification.

The original image was converted to grayscale for image analysis for cluster recognition. The Sobel operator detected the edges in the image and converted them into a binary format based on the threshold. Next, the binary edge image was expanded by linear structural elements to enhance the features in the binary image. White pixels within the middle of the binary image indicated the ROIs.

(H) Statistical Analysis

Student's t-tests were used to evaluate the associations between each independent variable. P values among each group were calculated. The ROC curve was constructed using the nGV, $nSD^{nGV}$, and RGVSD as predictors for distinguishing healthy and patient samples. The cutoff value was obtained using Youden's index, which maximized the sensitivity and specificity. Sensitivity was determined as the ratio of true positives and the number of true positives plus false negatives. Specificity was determined as the ratio of true negatives and the number of true negatives plus false positives. Triplicates were carried out for all experiments.

Although the invention has been described in terms of certain embodiments, other embodiments apparent to those of ordinary skill in the art are also within the scope of this invention. Accordingly, the scope of the invention is intended to be defined only by the claims which follow.

INDUSTRIAL APPLICABILITY

Below summarizes some advantages and potential applications of the present invention:

The present invention provides a label-free predictive tool for disease prognosis using patient-derived tumor models from the liquid biopsy. The present LIQBP could be customized to add or remove functions, providing ease of operation and application flexibility.

Test images could be analyzed in batches within a short period of time (can be as fast as one minute), significantly reducing workforce requirements and the speed at which treatment intervention could be realized.

The present LIQBP provides readouts in a label-free and quantitative manner without the need for visualization.

The present LIQBP is low cost, with minimal training, and no associated toxicity of dyes, rendering a highly beneficial prediction tool for use even in regions with limited resources.

The present LIQBP significantly and robustly reflects disease heterogeneity among cancer types.

Optical systems for visualization in the present invention could also be further minimized to achieve portable on-site detection.

The present invention can be used in discovery and validation of new combinatorial drug Integration of convolutional neural networks into the LIQBP in the present invention realizes the transition from physical-driven analysis to data-driven analysis and realize high-throughput screening.

It also helps decentralization of healthcare, improving cancer diagnosis, and promoting the in-house prognostic point of care.

The present invention is a novel, less-invasive approach for label-free prediction of disease prognosis can help clinicians identify disease or signal the need for new therapeutic strategies.

The fully automatic classification and detection of cell phenotype saves a lot of time and avoids errors arising from human intervention during the sample preparation, data processing and analysis as in the conventional methods.

REFERENCE

Below is a list of literatures cited herein:

1. Ferlay, J.; Colombet, M.; Soerjomataram, I.; Parkin, D. M.; Piñeros, M.; Znaor, A.; Bray, F. Cancer statistics for the year 2020: An overview. *Int. J. Cancer* 2021, 149, 778-789.
2. Vaidyanathan, R.; Soon, R. H.; Zhang, P.; Jiang, K.; Lim, C. T. Cancer diagnosis: From tumor to liquid biopsy and beyond. *Lab Chip* 2019, 19, 11-34.
3. Chen, C. K.; Liao, J.; Li, M. S.; Khoo, B. L. Urine biopsy technologies: Cancer and beyond. *Theranostics* 2020, 10, 7872.
4. Siravegna, G.; Marsoni, S.; Siena, S.; Bardelli, A. Integrating liquid biopsies into the management of cancer. *Nat. Rev. Clin. Oncol.* 2017, 14, 531-548.
5. Allan, A. L.; Keeney, M. Circulating tumor cell analysis: Technical and statistical considerations for application to the clinic. *J. Oncol.* 2010, 2010, 1-10.
6. Johnson, J.; Decker, S.; Zaharevitz, D.; Rubinstein, L.; Venditti, J.; Schepartz, S.; Kalyandrug, S.; Christian, M.; Arbuck, S.; Hollingshead, M. Relationships between drug activity in NCI preclinical in vitro and in vivo models and early clinical trials. *Br. J. Cancer* 2001, 84, 1424-1431.

7. van de Merbel, A. F.; van der Horst, G.; van der Pluijm, G. Patient-derived tumour models for personalized therapeutics in urological cancers. *Nat. Rev. Urol.* 2021, 18, 33-45.

8. Weiswald, L.-B.; Bellet, D.; Dangles-Marie, V. Spherical cancer models in tumor biology. *Neoplasia* 2015, 17, 1-15.

9. Chen, Y.-C.; Zhang, Z.; Yoon, E. Early prediction of single-cell derived sphere formation rate using convolutional neural network image analysis. *Analyt. Chem.* 2020, 92, 7717-7724.

10. Zhang, Z.; Chen, L.; Wang, Y.; Zhang, T.; Chen, Y.-C.; Yoon, E. Label-Free Estimation of Therapeutic Efficacy on 3D Cancer Spheres Using Convolutional Neural Network Image Analysis. *Analyt. Chem.* 2019, 91, 14093-14100.

11. Khoo, B. L.; Lee, S. C.; Kumar, P.; Tan, T. Z.; Warkiani, M. E.; Ow, S. G.; Nandi, S.; Lim, C. T.; Thiery, J. P. Short-term expansion of breast circulating cancer cells predicts response to anti-cancer therapy. *Oncotarget* 2015, 6, 15578.

12. Alizadeh, A. A.; Aranda, V.; Bardelli, A.; Blanpain, C.; Bock, C.; Borowski, C.; Caldas, C.; Califano, A.; Doherty, M.; Elsner, M. Toward understanding and exploiting tumor heterogeneity. *Nat. Med.* 2015, 21, 846-853.

13. Bedard, P. L.; Hansen, A. R.; Ratain, M. J.; Siu, L. L. Tumour heterogeneity in the clinic. *Nature* 2013, 501, 355-364.

14. Dagogo-Jack, I.; Shaw, A. T. Tumour heterogeneity and resistance to cancer therapies. *Nat. Rev. Clin. Oncol.* 2018, 15, 81-94.

15. Chen, C. K.; Zhang, J.; Bhingarde, A.; Matotek, T.; Barrett, J.; Hardesty, B. D.; Holl, M. M. B.; Khoo, B. L. A portable purification system for the rapid removal of microplastics from environmental samples. *Chem. Eng. J.* 2022, 428, 132614.

16. Dai, B.; Chen, S.; Li, W.; Zheng, L.; Han, X.; Fu, Y.; Wu, J.; Lin, F.; Zhang, D.; Zhuang, S. Fully-functional semi-automated microfluidic immunoassay platform for quantitation of multiple samples. *Sens. Actuators B Chem.* 2019, 300, 127017.

17. Fu, Y.; Li, W.; Dai, B.; Zheng, L.; Zhang, Z.; Qi, D.; Cheng, X.; Zhang, D.; Zhuang, S. Diagnosis of mixed infections with swine viruses using an integrated microfluidic platform. *Sens. Actuators B Chem.* 2020, 312, 128005.

18. Dai, B.; Yin, C.; Wu, J.; Li, W.; Zheng, L.; Lin, F.; Han, X.; Fu, Y.; Zhang, D.; Zhuang, S. A flux-adaptable pump-free microfluidics-based self-contained platform for multiplex cancer biomarker detection. *Lab Chip* 2021, 21, 143-153.

19. Li, Z.; Ju, R.; Sekine, S.; Zhang, D.; Zhuang, S.; Yamaguchi, Y. All-in-one microfluidic device for on-site diagnosis of pathogens based on an integrated continuous flow PCR and electrophoresis biochip. *Lab Chip* 2019, 19, 2663-2668.

20. Zhang, M.; Wang, P.; Luo, R.; Wang, Y.; Li, Z.; Guo, Y.; Yao, Y.; Li, M.; Tao, T.; Chen, W. Biomimetic human disease model of SARS-CoV-2-induced lung injury and immune responses on organ chip system. *Adv. Sci.* 2021, 8, 2002928.

21. Schuster, B.; Junkin, M.; Kashaf, S. S.; Romero-Calvo, I.; Kirby, K.; Matthews, J.; Weber, C. R.; Rzhetsky, A.; White, K. P.; Tay, S. Automated microfluidic platform for dynamic and combinatorial drug screening of tumor organoids. *Nat. Commun.* 2020, 11, 1-12.

22. Eduati, F.; Utharala, R.; Madhavan, D.; Neumann, U. P.; Longerich, T.; Cramer, T.; Saez-Rodriguez, J.; Merten, C. A. A microfluidics platform for combinatorial drug screening on cancer biopsies. *Nat. Commun.* 2018, 9, 1-13.

23. Pei, H.; Li, L.; Han, Z.; Wang, Y.; Tang, B. Recent advance in microfluidic technologies for circulating tumor cells: From enrichment, single cell analysis to liquid biopsy for clinical applications. *Lab Chip* 2020, 20, 3854-3875.

24. Belotti, Y.; Lim, C. T. Microfluidics for Liquid Biopsies: Recent Advances, Current Challenges, and Future Directions. *Analyt. Chem.* 2021, 93, 4727-4738. https://doi.org/10.1021/acs.analchem.1c00410.

25. Khoo, B. L.; Shang, M.; Ng, C. H.; Lim, C. T.; Chng, W. J.; Han, J. Liquid biopsy for minimal residual disease detection in leukemia using a portable blast cell biochip. *NPJ Precis. Oncol.* 2019, 3, 1-12.

26. Liao, J.; Ren, J.; Wei, H.; Lam, R. H.; Chua, S. L.; Khoo, B. L. Label-free biosensor of phagocytosis for diagnosing bacterial infections. *Biosens. Bioelectron.* 2021, 191, 113412.

27. Chen, J.-F.; Zhu, Y.; Lu, Y.-T.; Hodara, E.; Hou, S.; Agopian, V. G.; Tomlinson, J. S.; Posadas, E. M.; Tseng, H.-R. Clinical applications of NanoVelcro rare-cell assays for detection and characterization of circulating tumor cells. *Theranostics* 2016, 6, 1425.

28. Antfolk, M.; Laurell, T. Continuous flow microfluidic separation and processing of rare cells and bioparticles found in blood—A review. *Analyt. Chim. Acta* 2017, 965, 9-35.

29. Katt, M. E.; Placone, A. L.; Wong, A. D.; Xu, Z. S.; Searson, P. C. In vitro tumor models: Advantages, disadvantages, variables, and selecting the right platform. *Front. Bioeng. Biotechnol.* 2016, 4, 12.

30. Lüönd, F.; Tiede, S.; Christofori, G. Breast cancer as an example of tumour heterogeneity and tumour cell plasticity during malignant progression. *Br. J. Cancer* 2021, 125, 164-175.

31. Polyak, K. Heterogeneity in breast cancer. *J. Clin. Investig.* 2011, 121, 3786-3788.

32. Dai, B.; Jiao, Z.; Zheng, L.; Bachman, H.; Fu, Y.; Wan, X.; Zhang, Y.; Huang, Y.; Han, X.; Zhao, C. Colour compound lenses for a portable fluorescence microscope. *Light Sci. Appl.* 2019, 8, 75.

33. Snow, J. W.; Koydemir, H. C.; Karinca, D. K.; Liang, K.; Tseng, D.; Ozcan, A. Rapid imaging, detection, and quantification of *Nosema* ceranae spores in honey bees using mobile phone-based fluorescence microscopy. *Lab Chip* 2019, 19, 789-797.

34. Khoo, B. L.; Grenci, G.; Lim, J. S. Y.; Lim, Y. P.; Fong, J.; Yeap, W. H.; Lim, S. B.; Chua, S. L.; Wong, S. C.; Yap, Y.-S. Low-dose anti-inflammatory combinatorial therapy reduced cancer stem cell formation in patient-derived preclinical models for tumour relapse prevention. *Br. J. Cancer* 2019, 120, 407-423.

35. Moen, E.; Bannon, D.; Kudo, T.; Graf, W.; Covert, M.; Van Valen, D. Deep learning for cellular image analysis. *Nat. Methods* 2019, 16, 1233-1246.

36. Topol, E. J. High-performance medicine: The convergence of human and artificial intelligence. *Nat. Med.* 2019, 25, 44-56.

37. Isozaki, A.; Mikami, H.; Tezuka, H.; Matsumura, H.; Huang, K.; Akamine, M.; Hiramatsu, K.; Iino, T.; Ito, T.;

Karakawa, H. Intelligent image-activated cell sorting 2.0. *Lab Chip* 2020, 20, 2263-2273.
38. Isozaki, A.; Harmon, J.; Zhou, Y.; Li, S.; Nakagawa, Y.; Hayashi, M.; Mikami, H.; Lei, C.; Goda, K. AI on a chip. *Lab Chip* 2020, 20, 3074-3090.
39. Deng, Y.; Liu, S. Y.; Chua, S. L.; Khoo, B. L. The effects of biofilms on tumor progression in a 3D cancer-biofilm microfluidic model. *Biosens. Bioelectron.* 2021, 180, 113113. https://doi.org/10.1016/j.bios.2021.113113.
40. Khoo, B. L.; Grenci, G.; Lim, Y. B.; Lee, S. C.; Han, J.; Lim, C. T. Expansion of patient-derived circulating tumor cells from liquid biopsies using a CTC microfluidic culture device. *Nat. Protoc.* 2018, 13, 34-58.
41. Warkiani, M. E.; Khoo, B. L.; Tan, D. S.-W.; Bhagat, A. A. S.; Lim, W.-T.; Yap, Y. S.; Lee, S. C.; Soo, R. A.; Han, J.; Lim, C. T. An ultra-high-throughput spiral microfluidic biochip for the enrichment of circulating tumor cells. *Analyst* 2014, 139, 3245-3255.

What is claimed is:

1. A patient-derived liquid biopsy-based platform comprising three main sections:
    an in vitro disease model established by liquid biopsy from one or more subjects;
    a cell cluster image processing and analytical tool; and
    an image acquisition module,
    the in vitro disease model comprising a microfluidic device;
    the cell cluster image processing and analytical tool comprising a deep learning neural network for image segmentation and classification;
    wherein the microfluidic device is a microfluidic biochip comprising at least two layers: a bottom layer comprised of a plurality of microwells each having an ellipsoidal base for cell cluster establishment, and a top layer as a barrier layer for avoiding fluid mixing among different microwells; and
    wherein the at least two layers of the microfluidic device are made of a flexible thermoplastic material.

2. The patient-derived liquid biopsy-based platform of claim 1, wherein the cell cluster image processing and analytical tool further comprises a user interface and a data augmentation module for optimizing image data obtained from the cell clusters by the image acquisition module and annotating thereof before being subject to said deep learning neural network.

3. The patient-derived liquid biopsy-based platform of claim 2, wherein the data augmentation module is configured to apply augmentation content including horizontal flip, vertical flip, rotation, enlargement, random cropping, image gray scaling; normalize images of microwells and cell clusters; and annotate thereof before being fed to the neural network.

4. The patient-derived liquid biopsy-based platform of claim 1, wherein image data obtained by the image acquisition module comprises one or more of bright-field, dark-field, differential interference contrast, and phase-contrast microscopy images.

5. The patient-derived liquid biopsy-based platform of claim 1, wherein the image acquisition module is selected from a phase-contrast microscope.

6. The patient-derived liquid biopsy-based platform of claim 1, wherein the neural network comprises ResUnet++ network and Resnet 34 network.

7. The patient-derived liquid biopsy-based platform of claim 1, wherein the one or more subjects comprise healthy donors and patients clinically diagnosed or pathologically with a cancer or detectable tumor.

8. The patient-derived liquid biopsy-based platform of claim 7, wherein the patients are at different treatment stages of cancer progression including pre-treatment stage, and treatment cycles from 1 to 8.

9. The patient-derived liquid biopsy-based platform of claim 1, wherein the neural network is configured to perform flat-field correction, auto ellipse detection, edge detection, and morphology characterizations on the cell cluster images.

10. A method for predicting cancer stages of a subject based on cell cluster characteristics of a biological sample obtained from the subject, comprising:
    obtaining a liquid biopsy sample from a subject;
    isolating a nucleated cell fraction from the liquid biopsy sample;
    culturing the nucleated cell fraction in one or more microwells of a microfluidic device until cell clusters are formed;
    acquiring images of the microwells by an image acquisition module in the absence of any labelling agents;
    selecting images with the microwells;
    cropping areas in the images with single microwell;
    identifying presence of cell clusters in the cropped areas;
    extracting different features from the identified cell clusters;
    quantifying morphological parameters of the cell clusters from the extracted features;
    outputting quantitative attributes of the morphological parameters and comparing thereof with a threshold of each of the morphological parameters in order to determine phenotype of the cells forming the cell cluster and predict disease prognosis of the subject associated with said phenotype;
    wherein the microfluidic device is a microfluidic biochip comprising at least two layers: a bottom layer comprised of a plurality of microwells each having an ellipsoidal base for cell cluster establishment, and a top layer as a barrier layer for avoiding fluid mixing among different microwells; and
    wherein the at least two layers of the microfluidic device are made of a flexible thermoplastic material.

11. The method of claim 10, wherein the liquid biopsy is peripheral blood.

12. The method of claim 10, wherein the morphological parameters include cluster size, thickness, roughness and compactness.

13. The method of claim 10, wherein the cluster size is computed based on percentage of white pixels and scale of the microwell.

14. The method of claim 10, wherein the cell cluster thickness is determined by an average gray value of the cell cluster with respect to a maximum gray value of each microwell.

15. The method of claim 10, wherein the cell cluster roughness is determined by a normalized standard deviation of gray value ($nSD^{GV}$) or a ratio of normalized gray value to the normalized standard deviation of the gray value of the cell clusters (RGVSD).

16. The method of claim 10, wherein the cell cluster compactness is determined by a ratio of normalized gray value to cluster size (RGVS).

17. A method for training a neural network based on one or more deep learning models for patient phenotyping and predicting disease prognosis of a subject based on cell cluster image datasets obtained from an in vitro disease model derived from liquid biopsy samples of subjects from different cohorts, the method comprising:

providing the in vitro disease model established on a microfluidic device;

acquiring cell cluster images from different liquid biopsy samples at more than one magnification powers of microscopy in the absence of any labelling agent;

identifying region of interest from the cell cluster images;

resizing the cell cluster images according to the identified region of interest;

annotating the resized cell cluster images according to the presence or absence of cell clusters in the identified region of interest;

preparing corresponding datasets for training different sections of the neural network; loading the corresponding datasets to the neural network for training image segmentation and classification, respectively;

wherein the microfluidic device is a microfluidic biochip comprising at least two layers: a bottom layer comprised of a plurality of microwells each having an ellipsoidal base for cell cluster establishment, and a top layer as a barrier layer for avoiding fluid mixing among different microwells; and wherein the at least two layers of the microfluidic device are made of a flexible thermoplastic material.

18. The method of claim 17, wherein the neural network comprises a segmentation section based on ResUnet++ network and a classification section based on Resnet 34 network, and wherein the cell cluster image datasets include segmentation datasets and classification datasets.

* * * * *